(12) United States Patent
Zong et al.

(10) Patent No.: US 11,463,920 B2
(45) Date of Patent: Oct. 4, 2022

(54) COMMUNICATIONS METHOD, APPARATUS, AND SYSTEM

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/037,172

(22) Filed: Sep. 29, 2020

(65) Prior Publication Data

US 2021/0022047 A1   Jan. 21, 2021

Related U.S. Application Data

(63) Continuation of application No. PCT/CN2019/078217, filed on Mar. 15, 2019.

(30) Foreign Application Priority Data

Mar. 30, 2018 (CN) .................. 201810278045.3

(51) Int. Cl.
*H04W 36/00* (2009.01)
*H04W 76/12* (2018.01)
*H04W 36/08* (2009.01)

(52) U.S. Cl.
CPC ....... *H04W 36/0016* (2013.01); *H04W 76/12* (2018.02); *H04W 36/08* (2013.01)

(58) Field of Classification Search
None
See application file for complete search history.

(56) References Cited

U.S. PATENT DOCUMENTS

2018/0198867 A1\* 7/2018 Dao .................. H04L 67/14
2019/0141583 A1   5/2019 Ying et al.
(Continued)

FOREIGN PATENT DOCUMENTS

CN   106792936 A   5/2017
CN   107623906 A   1/2018
(Continued)

OTHER PUBLICATIONS

3GPP TR 23.726 V0.2.0 (Mar. 2018), "3rd Generation Partnership Project; Technical Specification Group Services and System Aspects; Study on Enhancing Topology of SMF and UPF in 5G Networks (Release 16)," 32 pages.
(Continued)

*Primary Examiner* — Saba Tsegaye
(74) *Attorney, Agent, or Firm* — Conley Rose, P.C.

(57) ABSTRACT

A communications method, apparatus, and system to implement handover between session management network elements, where a target session management network element sends a first message to a source session management network element based on the information about the source session management network element received. After receiving the first message from the target intermediate session management network element, the source session management network element indicates, based on the first message, a source intermediate user plane network element to establish a forwarding tunnel. As such, the forwarding tunnel between the source intermediate user plane network element and a target intermediate user plane network element is established, and the source intermediate user plane network element can forward data to the target intermediate user plane network element through the forwarding tunnel.

20 Claims, 10 Drawing Sheets

(56) References Cited

U.S. PATENT DOCUMENTS

| | | | |
|---|---|---|---|
| 2020/0015131 A1* | 1/2020 | Ying | H04W 48/18 |
| 2020/0112898 A1* | 4/2020 | Ramle | H04W 36/08 |
| 2020/0120570 A1* | 4/2020 | Youn | H04W 36/0033 |
| 2020/0137828 A1* | 4/2020 | Yang | H04W 36/0011 |
| 2020/0187277 A1* | 6/2020 | Lee | H04W 80/10 |
| 2020/0213912 A1* | 7/2020 | Shi | H04W 36/0011 |
| 2020/0344655 A1* | 10/2020 | Rommer | H04W 88/14 |

FOREIGN PATENT DOCUMENTS

| | | |
|---|---|---|
| CN | 107846713 A | 3/2018 |
| EP | 3468253 A1 | 4/2019 |
| RU | 2474077 C2 | 1/2013 |
| WO | 2017167247 A1 | 10/2017 |
| WO | 2018000457 A1 | 1/2018 |

OTHER PUBLICATIONS

3GPP TS 23.501 V15.1.0 (Mar. 2018),"3rd Generation Partnership Project; Technical Specification Group Services and System Aspects; System Architecture for the 5G System; Stage 2 (Release 15)," 201 pages.

3GPP TS 23.502 V15.1.0 (Mar. 2018), "3rd Generation Partnership Project; Technical Specification Group Services and System Aspects; Procedures for the 5G System; Stage 2(Release 15)," 285 pages.

S2-174578, Catt, "TS 23.502: Inserting intermediate SMF during registration procedure," SA WG2 Meeting #122, Jun. 26-30, 2017, San Jose Del Cabo, Mexico, 4 pages.

S2-182473, Ericsson, "ETSUN Solution to key issues 1 and 4," SA WG2 Meeting #126, Feb. 26-Mar. 2, 2018, Montreal, Canada, 5 pages.

S2-182530, Catt, "ETSUN solution for objective 1," SA WG2 Meeting #126, Feb. 26-Mar. 2, 2018, Montreal, Canada, 3 pages.

Ericsson, "SMF Service Areas," SA WG2 Meeting #122 S2-174193, Jun. 26-30, 2017, Mexico, 17 pages.

Huawei et al.,"Operation type in Nsmf_PDUSession_UpdateSMContext Request," 3GPP TSG-SA2 Meeting #126, S2-181667, Montreal, Canada, Feb. 26-Mar. 2, 2018, 22 pages.

Huawei, et al., "Service Request handling for solution 6 [online], " 3GPP TSG SA WG2 #127BIS, S2-185116, May 22, 2018, 4 pages.

Ericsson, "23.501: UPF and SMF Service Areas," SA WG2 Meeting #120, S2-171750, Mar. 2017, Busan, Korea, 8 pages.

3GPP TS 23.502 V0.6.0, Aug. 2017, "3rd Generation Partnership Project; Technical Specificcation Group Services and System Aspects; Procedures for the 5G System; Stage 2 (Release 15)," 148 pages.

3GPP TR 23.799 V1.0.1, Sep. 28, 2016, "3rd Generation Partnership Project; Technical Specification Group Services and System Aspects; Study on Architecture for Next Generation System (Release 14)", 423 pages.

* cited by examiner

COMMUNICATIONS METHOD, APPARATUS, AND SYSTEM

CROSS-REFERENCE TO RELATED APPLICATIONS

This application is a continuation of International Patent Application No. PCT/CN2019/078217, filed on Mar. 15, 2019, and which claims priority to Chinese Patent Application No. 201810278045.3, filed on Mar. 30, 2018. The disclosures of the aforementioned applications are hereby incorporated by reference in their entireties.

TECHNICAL FIELD

This application relates to the field of communications technologies, and in particular, to a communications method, apparatus, and system.

BACKGROUND

A conventional communications system includes two parts: an access network and a core network. The access network is on edge of a mobile communications system, and is responsible for connecting terminal devices to the core network. The core network is responsible for connecting the terminal devices to different data networks (DNs), and implementing functions such as charging and mobility management. An access function of the access network is mainly implemented using a base station. The core network mainly includes the following core network devices: a mobility management network element, a session management network element, a user plane network element, and the like.

When a terminal device requests to access a data network, the core network establishes a session for the terminal device. In this way, the terminal device can transmit data to the data network based on the session, to implement communications service. When the core network establishes a session, the following procedure is performed.

First, the terminal device sends, to a base station, a request message requesting to establish a session or requesting a service, and the base station sends, to a mobility management network element, the request message sent by the terminal device. The mobility management network element determines a session management network element based on the request message, and sends a session request to the session management network element. After receiving the session request, the session management network element selects a user plane network element in a service area of the session management network element, and initiates a session establishment procedure to the user plane network element. Finally, a complete session is established.

In some scenarios, the session of the terminal device may relate to a plurality of user plane network elements, for example, an intermediate user plane network element connected to the base station and an anchor user plane network element connected to the DN. If the intermediate user plane network element and the anchor user plane network element are located in different service areas, a session management network element in a corresponding service area needs to manage the intermediate user plane network element or the anchor user plane network element respectively. In other words, an intermediate session management network element manages the intermediate user plane network element in a service area 1 in which the intermediate user plane network element is located, and an anchor session management network element manages the anchor user plane network element in a service area 2 in which the anchor user plane network element is located.

Due to mobility of the terminal device, the terminal device may move from the service area 1 to a service area 3. In this case, in the core network, a new intermediate user plane network element in the service area 3 needs to be selected for re-establishing a session of the terminal device, to ensure service continuity of the terminal device. Therefore, in the core network, an intermediate session management network element in the service area 3 needs to manage the new intermediate user plane network element.

However, currently, there is no technical solution for implementing handover between session management network elements. Consequently, in the core network, the intermediate session management network element that manages the new intermediate user plane network element cannot be determined in the service area 3. Consequently, a session cannot be re-established.

SUMMARY

This application provides a communications method, apparatus, and system, to implement handover between session management network elements.

According to a first aspect, an embodiment of this application provides a communications method, and the method may be performed by a session management network element or a chip in the session management network element. The session management network element may be a session management function (SMF) entity in $5^{th}$ generation (5G) communication, and may be another entity having a session management function in future communication. The method includes the following steps: First, a target intermediate session management network element obtains information about a source session management network element, and then sends a first message to the source session management network element based on the information about the source session management network element. The source session management network element is a session management network element that controls a user plane network element communicatively connected with a source base station. The first message is used to establish a forwarding tunnel from a source intermediate user plane network element to a target intermediate user plane network element, the source intermediate user plane network element is a user plane network element that is controlled by the source session management network element and that is communicatively connected with the source base station, and the target intermediate user plane network element is a user plane network element that is controlled by the target intermediate session management network element and that is communicatively connected with a target base station.

According to the foregoing method, the forwarding tunnel from the source intermediate user plane network element to the target intermediate user plane network element is established, such that the source intermediate user plane network element can forward data to the target intermediate user plane network element through the forwarding tunnel, to implement handover from the target intermediate session management network element to the source session management network element, maintain a session of a terminal device, and ensure service continuity of the terminal device.

In a possible design, before the target intermediate session management network element sends the first message to the source session management network element based on the information about the source session management network element, the target intermediate session management network element may first obtain first indication information. The first indication information indicates the target intermediate session management network element to establish the forwarding tunnel.

According to the foregoing method, the target intermediate session management network element can determine, by obtaining the first indication information, that the forwarding tunnel needs to be established currently, and then establish the forwarding tunnel. This can improve flexibility and efficiency of establishing the forwarding tunnel.

In a possible design, the target intermediate session management network element obtains the first indication information in a plurality of manners, and two manners are listed.

Manner 1: The target intermediate session management network element may obtain the first indication information from the source session management network element. In this case, the target intermediate session management network element can directly interact with the source session management network element to obtain the first indication information.

Manner 2: The target intermediate session management network element obtains the first indication information from a mobility management network element.

According to the foregoing method, the first indication information may be sent by different network elements to the target intermediate session management network element. Different manners of establishing the forwarding tunnel are provided and may be applied to different scenarios, to ensure a wider range of application scenarios.

In a possible design, after obtaining the first indication information, the target intermediate session management network element may indicate, according to the first indication information, the target intermediate user plane network element to establish the forwarding tunnel.

According to the foregoing method, the first indication information is used as an indication to establish the forwarding tunnel, such that the forwarding tunnel can be successfully established, and efficiency of establishing the forwarding tunnel can be improved.

In a possible design, the first message may include information used to identify the forwarding tunnel, for example, the first message includes forwarding tunnel information corresponding to the target intermediate user plane network element.

According to the foregoing method, the first message includes the forwarding tunnel information corresponding to the target intermediate user plane network element. As such, the target intermediate session management network element can conveniently and quickly establish the forwarding tunnel.

In a possible design, to enable the target intermediate session management network element to directly interact with the source session management network element, the target intermediate session management network element needs to obtain the information about the source session management network element. For example, the target intermediate session management network element obtains the information about the source session management network element from the mobility management network element.

According to the foregoing method, the target intermediate session management network element obtains the information about the source session management network element, such that the target intermediate session management network element can directly interact with the source session management network element. A manner in which the source session management network element directly interacts with the target intermediate session management network element is relatively quick and efficient, and efficiency of establishing the forwarding tunnel can be improved.

In a possible design, after establishing the forwarding tunnel, the target intermediate session management network element sets a forwarding tunnel release timer. When the forwarding tunnel release timer expires, the target intermediate session management network element indicates the intermediate user plane network element to release the forwarding tunnel.

According to the foregoing method, the forwarding tunnel release timer is set, such that tunnel resources can be saved. When the forwarding tunnel is to be released, only whether the forwarding tunnel release timer expires needs to be determined, and the target intermediate session management network element does not need to send other signaling, such that signaling resources can be effectively saved.

In a possible design, in addition to the forwarding tunnel, a tunnel between the target intermediate user plane network element and an anchor user plane network element may be further established. A process is as follows.

The target intermediate session management network element obtains session information from the source session management network element based on the information about the source session management network element; or the target intermediate session management network element receives the session information from the mobility management network element; and the target intermediate session management network element establishes the tunnel between the target intermediate user plane network element and the anchor user plane network element based on the session information.

The session information includes at least one of the following: uplink tunnel information of the anchor user plane network element or information about an anchor session management network element, where the anchor session management network element is a session management network element that controls the anchor user plane network element.

According to the foregoing method, data that needs to be transmitted between a data network and the terminal device may be transmitted through the tunnel between the target intermediate user plane network element and the anchor user plane network element. As such, the terminal device can receive and send data in a timely manner, thereby ensuring the service continuity of the terminal device.

In a possible design, the first indication information may be carried in the session information.

According to the foregoing method, the session information and the first indication information may be sent together, such that signaling resources can be effectively saved, and efficiency can be improved.

In a possible design, the information about the source session management network element may be carried in the session information.

According to the foregoing method, the session information and the information about the source session management network element may be sent together, such that signaling resources can be effectively saved, and efficiency can be improved.

According to a second aspect, an embodiment of this application provides a communications method, and the method may be performed by a session management network element or a chip in the session management network element. The session management network element may be an SMF entity in 5G communication, and may be another entity having a session management function in future communication. The method includes the following steps:

First, a source session management network element receives a first message from a target intermediate session management network element, and then indicates, based on the first message, a source intermediate user plane network element to establish a forwarding tunnel.

The first message is used to establish a forwarding tunnel from the source intermediate user plane network element to a target intermediate user plane network element, and the source intermediate user plane network element is a user plane network element that is controlled by the source session management network element and that is communicatively connected with a source base station, and the target intermediate session management network element is a session management network element that controls the target intermediate user plane network element communicatively connected with a target base station.

According to the foregoing method, the forwarding tunnel from the source intermediate user plane network element to the target intermediate user plane network element is established, such that the source intermediate user plane network element can forward data to the target intermediate user plane network element through the forwarding tunnel, to implement handover from the target intermediate session management network element to the source session management network element, maintain a session, and ensure service continuity of a terminal device.

In a possible design, before the source session management network element receives the first message from the target intermediate session management network element, the source session management network element may first determine that the forwarding tunnel needs to be established, and then send the first indication information to the target intermediate session management network element or a mobility management network element. The first indication information indicates the target intermediate session management network element to establish the forwarding tunnel.

According to the foregoing method, when determining that the forwarding tunnel needs to be established, the source session management network element sends the first indication information, to indicate the target intermediate session management network element to establish the forwarding tunnel. This can improve flexibility and efficiency of establishing the forwarding tunnel.

In a possible design, the source session management network element may determine, in a plurality of manners, that the forwarding tunnel needs to be established. When the source session management network element or the source intermediate user plane network element has downlink data to be sent to the terminal device, the source session management network element may determine that the forwarding tunnel needs to be established.

According to the foregoing method, the forwarding tunnel is established when the downlink data needs to be sent to the terminal device. The source session management network element or the source intermediate user plane network element may send the downlink data to the terminal device through the forwarding tunnel, such that the terminal device can receive the data in a timely manner.

In a possible design, the first message may include information used to identify the forwarding tunnel, for example, the first message includes forwarding tunnel information corresponding to the target intermediate user plane network element.

According to the foregoing method, the first message includes the forwarding tunnel information corresponding to the target intermediate user plane network element, such that the target intermediate session management network element can conveniently and quickly establish the forwarding tunnel.

In a possible design, after establishing the forwarding tunnel, the source session management network element may set a forwarding tunnel release timer; and when the forwarding tunnel release timer expires, the source session management network element indicates the source intermediate user plane network element to release the forwarding tunnel.

According to the foregoing method, the forwarding tunnel release timer is set, such that tunnel resources can be saved. When the forwarding tunnel is to be released, only whether the forwarding tunnel release timer expires needs to be determined, and the source session management network element does not need to send other signaling, such that signaling resources can be effectively saved.

In a possible design, in addition to the forwarding tunnel, a tunnel between the target intermediate user plane network element and an anchor user plane network element may be further established. A process is as follows.

The source session management network element sends session information to the target intermediate session management network element, such that the target intermediate session management network element establishes the tunnel between the target intermediate user plane network element and the anchor user plane network element; or the source session management network element sends session information to the mobility management network element, such that the mobility management network element sends the session information to the target intermediate session management network element.

The session information includes at least one of the following: uplink tunnel information of the anchor user plane network element or information about an anchor session management network element, where the anchor session management network element is a session management network element that controls the anchor user plane network element.

According to the foregoing method, data that needs to be transmitted between a data network and the terminal device may be transmitted through the tunnel between the target intermediate user plane network element and the anchor user plane network element. As such, the terminal device can receive and send data in a timely manner, thereby ensuring the service continuity of the terminal device.

In a possible design, the first indication information may be carried in the session information.

According to the foregoing method, the session information and the first indication information may be sent together, such that signaling resources can be effectively saved, and efficiency can be improved.

In a possible design, the information about the source session management network element may be carried in the session information.

According to the foregoing method, the session information and the information about the source session management network element may be sent together, such that signaling resources can be effectively saved, and efficiency can be improved.

According to a third aspect, an embodiment of this application provides a communications method, and the method may be performed by a mobility management entity or a chip in the mobility management entity. The mobility management entity may be an access and mobility management function (AMF) entity in 5G communication, and may be another entity having a session management function in future communication. The method includes the following steps: A mobility management network element obtains information about a target intermediate session management network element. The mobility management network element sends information about a source session management network element to the target intermediate session management network element based on the information about the target intermediate session management network element, where the source session management network element is a session management network element that controls a user plane network element communicatively connected with a source base station, and the target intermediate session management network element is a session management network element that controls a target intermediate user plane network element communicatively connected with a target base station.

According to the foregoing method, the target intermediate session management network element obtains the information about the source session management network element, such that the target intermediate session management network element can directly interact with the source session management network element.

In a possible design, the mobility management network element sends first indication information to the target intermediate session management network element. The first indication information indicates the target intermediate session management network element to establish a forwarding tunnel from a source intermediate user plane network element to the target intermediate user plane network element, and the source intermediate user plane network element is a user plane network element that is controlled by the source session management network element and that is communicatively connected with the source base station.

According to the foregoing method, the mobility management network element indicates, by sending the first indication information, the target intermediate session management network element to establish the forwarding tunnel, such that flexibility and efficiency of establishing the forwarding tunnel can be improved.

In a possible design, before the mobility management network element sends the first indication information to the target intermediate session management network element, the mobility management network element may first determine that the forwarding tunnel needs to be established. Alternatively, the mobility management network element may obtain the first indication information from the source session management network element.

According to the foregoing method, the mobility management network element may determine the first indication information in different manners, and different manners of establishing the forwarding tunnel are provided and may be applied to different scenarios, to ensure a wider range of application scenarios.

In a possible design, if the mobility management network element receives, from the source session management network element, a message used to trigger a service request procedure, the mobility management network element determines that the forwarding tunnel needs to be established.

According to the foregoing method, when the service request procedure needs to be triggered, the forwarding tunnel is established. The source session management network element may establish a session using the forwarding tunnel, to ensure that a terminal device can receive data in a timely manner.

In a possible design, the mobility management network element may obtain the information about the target intermediate session management network element in a plurality of manners. The following lists two manners.

Manner 1: The mobility management network element first obtains location information of the terminal device, and then selects the information about the target intermediate session management network element based on the location information of the terminal device.

Manner 2: The mobility management network element receives the information about the target intermediate session management network element from the source session management network element.

According to the foregoing method, the information about the target intermediate session management network element is obtained in different manners, and a plurality of manners of establishing the forwarding tunnel are provided. As such, the communications method is applied to more scenarios.

In a possible design, in addition to the forwarding tunnel, a tunnel between the target intermediate user plane network element and an anchor user plane network element may be further established. A process is as follows.

The mobility management network element receives session information from the source session management network element, and the mobility management network element sends the session information to the target intermediate session management network element. As such, the target intermediate session management network element establishes the tunnel between the target intermediate user plane network element and the anchor user plane network element.

The session information includes at least one of the following: uplink tunnel information of the anchor user plane network element or information about an anchor session management network element, where the anchor session management network element is a session management network element that controls the anchor user plane network element.

According to the foregoing method, data that needs to be transmitted between a data network and the terminal device may be transmitted through the tunnel between the target intermediate user plane network element and the anchor user plane network element. As such, the terminal device can receive and send data in a timely manner, thereby ensuring the service continuity of the terminal device.

In a possible design, the first indication information may be carried in the session information.

According to the foregoing method, the session information and the first indication information may be sent together. As such, signaling resources can be effectively saved, and efficiency can be improved.

In a possible design, the information about the source session management network element may be carried in the session information.

According to the foregoing method, the session information and the information about the source session management network element may be sent together. As such, signaling resources can be effectively saved, and efficiency can be improved.

According to a fourth aspect, an embodiment of the present disclosure provides a communications system. For beneficial effects, refer to the descriptions of the first aspect and the second aspect. Details are not described herein again. The communications system includes a target intermediate session management network element and a source session management network element.

The target intermediate session management network element is configured to obtain information about the source session management network element, and send a first message to the source session management network element based on the information about the source session management network element. The source session management network element is configured to receive the first message from the target intermediate session management network element, and indicate, based on the first message, the source intermediate user plane network element to establish the forwarding tunnel.

The first message is used to establish a forwarding tunnel from the source intermediate user plane network element to a target intermediate user plane network element, where the source intermediate user plane network element is a user plane network element that is controlled by the source session management network element and that is communicatively connected with a source base station. The target intermediate user plane network element is a user plane network element that is controlled by the target intermediate session management network element and that is communicatively connected with a target base station.

In a possible design, before receiving the first message from the target intermediate session management network element, the source session management network element determines that the forwarding tunnel needs to be established, and sends first indication information to the target intermediate session management network element. The first indication information indicates the target intermediate session management network element to establish the forwarding tunnel.

In a possible design, the target intermediate session management network element obtains the first indication information from the source session management network element, and then indicates, according to the first indication information, the target intermediate user plane network element to establish the forwarding tunnel.

In a possible design, the source session management network element sends session information to the target intermediate session management network element, where the session information includes at least one of the following: uplink tunnel information of an anchor user plane network element or information about an anchor session management network element, where the anchor session management network element is a session management network element that controls the anchor user plane network element.

In a possible design, the target intermediate session management network element may further obtain the session information from the source session management network element based on the information about the source session management network element, and then establish tunnel between the target intermediate user plane network element and the anchor user plane network element based on the session information.

In a possible design, the communications system further includes a mobility management network element, and the mobility management network element determines that the forwarding tunnel needs to be established. Optionally, the first indication information is sent to the target intermediate session management network element. The first indication information indicates the target intermediate session management network element to establish the forwarding tunnel.

In a possible design, if the mobility management network element receives, from the source session management network element, a message used to trigger a service request procedure, the mobility management network element determines that the forwarding tunnel needs to be established.

It should be understood that names of the target intermediate session management network element, the source session management network element, and the mobility management network element in the communications system constitute no limitation on devices. In another network, the target intermediate session management network element, the source session management network element, and the mobility management network element may also be other network elements having corresponding functions.

According to a fifth aspect, an embodiment of this application further provides a communications apparatus. The apparatus is applied to a session management network element. For beneficial effects, refer to the descriptions of the first aspect. Details are not described herein again. The apparatus has functions of implementing actions in the method instance of the first aspect. The functions may be implemented by hardware, or may be implemented by hardware executing corresponding software. The hardware or the software includes one or more modules corresponding to the foregoing functions. In a possible design, a structure of the apparatus includes a processing unit and a transceiver unit. These units can execute corresponding functions in the foregoing method example of the first aspect. For details, refer to the detailed descriptions of the method example. Details are not described herein again.

According to a sixth aspect, an embodiment of this application further provides a communications apparatus. The apparatus is applied to a session management network element. For beneficial effects, refer to the descriptions of the second aspect. Details are not described herein again. The apparatus has functions of implementing actions in the method instance of the second aspect. The functions may be implemented by hardware, or may be implemented by hardware executing corresponding software. The hardware or the software includes one or more modules corresponding to the foregoing functions. In a possible design, a structure of the apparatus includes a processing unit and a transceiver unit. These units can execute corresponding functions in the foregoing method example of the second aspect. For details, refer to the detailed descriptions of the method example. Details are not described herein again.

According to a seventh aspect, an embodiment of this application further provides a communications apparatus. The apparatus is applied to a mobility management network element. For beneficial effects, refer to the descriptions of the third aspect. Details are not described herein again. The apparatus has functions of implementing actions in the method instance of the third aspect. The functions may be implemented by hardware, or may be implemented by hardware executing corresponding software. The hardware or the software includes one or more modules corresponding to the foregoing functions. In a possible design, a structure of the apparatus includes a processing unit and a transceiver unit. These units can execute corresponding functions in the foregoing method example of the third aspect. For details, refer to the detailed descriptions of the method example. Details are not described herein again.

According to an eighth aspect, an embodiment of this application further provides an apparatus. The apparatus is applied to a session management network element. For beneficial effects, refer to the descriptions of the first aspect. Details are not described herein again. A structure of the communications apparatus includes a processor and a memory. The processor is configured to support the apparatus in performing a corresponding function in the method of the first aspect. The memory is coupled to the processor, and stores a program instruction and data that are necessary for the terminal. A structure of the communications apparatus further includes a communications interface configured to communicate with another device.

According to a ninth aspect, an embodiment of this application further provides an apparatus. The apparatus is applied to a session management network element. For beneficial effects, refer to the descriptions of the second aspect. Details are not described herein again. A structure of the communications apparatus includes a processor and a memory. The processor is configured to support the apparatus in performing a corresponding function in the method of the second aspect. The memory is coupled to the processor, and stores a program instruction and data that are necessary for the terminal. A structure of the communications apparatus further includes a communications interface configured to communicate with another device.

According to a tenth aspect, an embodiment of this application further provides an apparatus. The apparatus is applied to a mobility management network element. For beneficial effects, refer to the descriptions of the third aspect. Details are not described herein again. A structure of the communications apparatus includes a processor and a memory. The processor is configured to support the apparatus in performing a corresponding function in the method of the third aspect. The memory is coupled to the processor, and stores a program instruction and data that are necessary for the terminal. A structure of the communications apparatus further includes a communications interface configured to communicate with another device.

According to an eleventh aspect, this application further provides a computer-readable storage medium. The computer-readable storage medium stores an instruction, and when the instruction is run on a computer, the computer is enabled to perform the methods according to the foregoing aspects.

According to a twelfth aspect, this application further provides a computer program product including an instruction. When the instruction is run on a computer, the computer is enabled to perform the methods according to the foregoing aspects.

According to a thirteenth aspect, this application further provides a computer chip. The chip is connected to a memory. The chip is configured to read and execute a software program stored in the memory, to perform the methods according to the foregoing aspects.

DESCRIPTION OF EMBODIMENTS

Figure 1A:
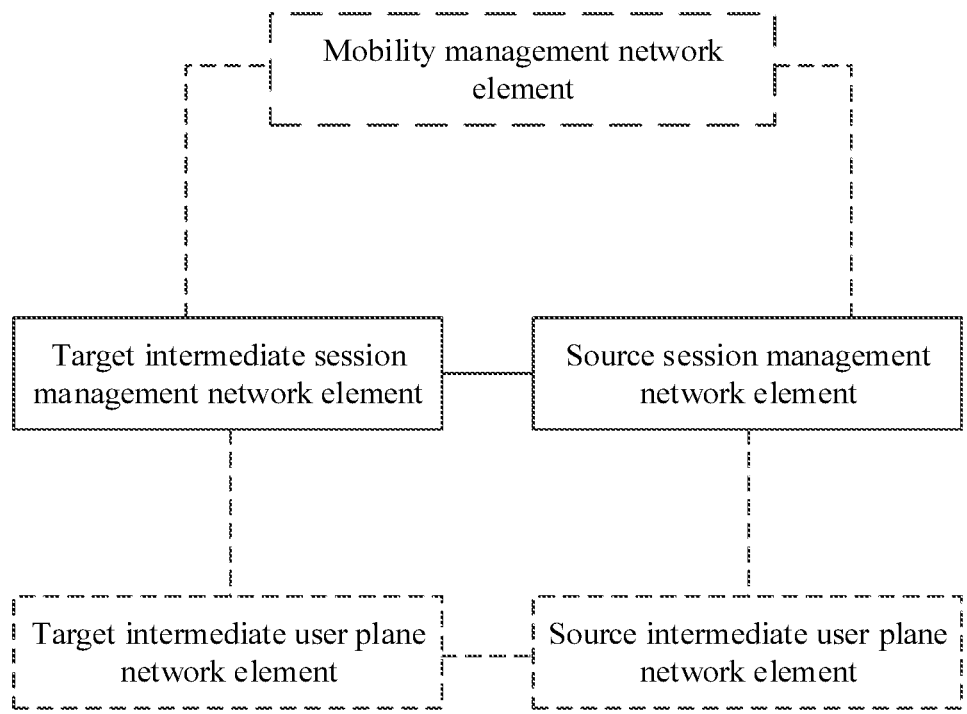
FIG. 1A to FIG. 1C are schematic diagrams of a system architecture according to this application.

To make the objectives, technical solutions, and advantages of this application clearer, the following further describes this application in detail with reference to the accompanying drawings. A specific operation method in method embodiments may also be applied to an apparatus embodiment or a system embodiment.

The following describes some terms in this application, to help a person skilled in the art have a better understanding.

1. A communications system is used to: when a terminal device requests a service, connect the terminal device to a DN, and transmit user plane data between the terminal device and the DN, to implement the corresponding service. The communications system is divided into an access network (AN) and a core network. The access network is used to connect terminal devices to the core network, and the core network is used to connect the terminal devices to different DNs. Based on logical function division, the core network may be further divided into a control plane and a user plane.

In addition, it should be further noted that a standard of the communications system is not limited in this application, and the communications system may be a 3rd generation (3G) communications system, a 4th generation (4G) communications system, a 5th generation (5G) communications system, and an evolved communications system based on the 3G communications system, the 4G communications system, or the 5G communications system.

2. A control plane network element in this application is responsible for a logical function of a control plane in a core network, may also be referred to as a control plane function (CPF) entity, and is a network element that is responsible for implementing a control management function, such as session management, access and mobility management, and policy control in the core network.

The control plane network element in this application mainly includes a session management network element and a mobility management network element.

The session management network element is responsible for a session management function, for example, allocating a user plane network element to a terminal device and establishing a session. For example, the session management network element may be a session management function (SMF) entity. After a session of the terminal device is established, a control plane path of the terminal device may include one or more session management network elements.

When the control plane path of the terminal device includes one session management network element, the session management network element may manage one or more user plane network elements related in the session of the terminal device.

When the control plane path of the terminal device includes a plurality of session management network elements, the session management network elements are classified into an intermediate session management network element and an anchor session management network element. The anchor session management network element controls a user plane network element connected to a data network in the session of the terminal device. For example, the anchor session management network element may be an anchor SMF (A-SMF) entity. The intermediate session management network element controls a user plane network element connected to a base station in the session of the terminal device. For example, the intermediate session management network element may be an intermediate SMF (I-SMF) entity.

The mobility management network element is responsible for functions such as access management and mobility management of the terminal device. In actual application, the functions include a mobility management function of a mobility management entity (MME) in a network architecture of Long-Term Evolution (LTE), and further include the access management function. For example, the mobility management network element may be an access and mobility management function (AMF) entity.

3. A user plane network element in this application is mainly responsible for data packet forwarding, quality of service (QoS) control, charging information statistics, and the like.

After a session (for example, a packet data unit (PDU) session) of a terminal device is established, on a user plane path of the terminal device, there may be one or more user plane network elements. Based on locations of the user plane network elements on the user plane path, the user plane network elements may be classified into an intermediate user plane network element and an anchor user plane network element. The anchor user plane network element is a user plane network element connected to a data network. For example, the anchor user plane network element may be an anchor user plane function (A-UPF) entity. The intermediate user plane network element is a user plane network element connected to a base station. For example, the intermediate user plane network element may be an intermediate user plane function (I-UPF) entity.

4. A terminal device in this application, or referred to as a user equipment (UE), may be deployed on land, for example, an indoor or outdoor device, a handheld device, or a vehicle-mounted device. Alternatively, the terminal device may be deployed on water (for example, on a ship) or may be deployed in the air (for example, on an airplane, a balloon, or a satellite). The terminal device may be a mobile phone, a tablet computer (pad), a computer with a wireless receiving/sending function, a virtual reality (VR) device, an augmented reality (AR) device, a wireless device in industrial control, a wireless device in self-driving, a wireless device in remote medical, a wireless device in smart grid, a wireless device in transportation safety, a wireless device in smart city, a wireless device in smart home, and the like.

5. An access network device in this application provides an access service for a terminal device, and controls a user to access a mobile communications network using an access network. The AN may be a radio access network (RAN) device or another AN device. For example, the access network device may be a gNB, a NodeB (NB), an evolved NodeB (eNB), a radio network controller (RNC), a base station controller (BSC), a base transceiver station (BTS), a home base station (for example, a Home eNB or a Home NodeB), a baseband unit (BBU), an access point (AP), or a worldwide interoperability for microwave access (WiMAX) base station (BS). This is not limited in this application.

6. A session in this application is a connection between a terminal device, an access network device, a user plane network element, and a data network, and is used to transmit user plane data between the terminal device and the data network.

It should be noted that "a plurality of" means "two or more" in this application.

In addition, it should be understood that in the descriptions of this application, terms such as "first" and "second" are merely used for differentiation and description, but should not be understood as indicating or implying relative importance, or should not be understood as indicating or implying a sequence.

FIG. 1A is a schematic diagram of a possible communications system to which a communications method is applicable according to this application. The communications system includes a target intermediate session management network element and a source session management network element, and optionally, further includes a target intermediate user plane network element controlled by the target intermediate session management network element and a source intermediate user plane network element controlled by the source session management network element. Optionally, the communications system may further include a mobility management network element.

In the communications system, one session management network element may control one or more user plane network elements. For ease of description, an example in which one session management network element controls one user plane network element is used for description of FIG. 1A.

Due to mobility of a terminal device, the terminal device may move from a service area of a current session management network element (which may be subsequently referred to as a "source session management network element" for ease of description) to a service area of another session management network element (which may be subsequently referred to as a "target intermediate session management network element").

In the foregoing case, to ensure continuity of a session of the terminal device, a forwarding tunnel needs to be established between the source intermediate user plane network element controlled by the source session management network element and the target intermediate user plane network element controlled by the target intermediate session management network element, to ensure that the source intermediate user plane network element can send data to the target intermediate user plane network element through the forwarding tunnel.

In addition, the target intermediate user plane network element controlled by the target intermediate session management network element needs to establish a tunnel with an anchor user plane network element, to ensure that data in a data network can be sent to a base station using the target intermediate user plane network element, and then the data is sent to the terminal device using the base station. Data of the terminal device may also be sent to the target intermediate user plane network element using a target base station, and then the data is sent to the data network using the target intermediate user plane network element.

In a process of establishing the forwarding tunnel in the communications system, the target intermediate session management network element is configured to obtain information about the source session management network element, and send a first message to the source session management network element based on the information about the source session management network element. The source session management network element is configured to receive the first message from the target intermediate session management network element, and indicate, based on the first message, the source intermediate user plane network element to establish the forwarding tunnel.

The first message is used to establish the forwarding tunnel from the source intermediate user plane network element to the target intermediate user plane network element, where the source intermediate user plane network element is a user plane network element that is controlled by the source session management network element and that is communicatively connected with a source base station. Additionally, the target intermediate user plane network element is a user plane network element that is controlled by the target intermediate session management network element and that is communicatively connected with the target base station.

In a possible implementation, before receiving the first message from the target intermediate session management network element, the source session management network element may determine that the forwarding tunnel needs to be established, and then send first indication information to the target intermediate session management network element. The first indication information indicates the target intermediate session management network element to establish the forwarding tunnel.

Optionally, the target intermediate session management network element obtains the first indication information from the source session management network element, and then indicates, according to the first indication information, the target intermediate user plane network element to establish the forwarding tunnel.

In a possible implementation, the source session management network element may further send session information to the target intermediate session management network element. The session information includes at least one of the following: uplink tunnel information of the anchor user plane network element or information about an anchor session management network element, where the anchor session management network element is a session management network element that controls the anchor user plane network element.

Optionally, the target intermediate session management network element may further obtain the session information from the source session management network element based on the information about the source session management network element, and then establish a tunnel between the target intermediate user plane network element and the anchor user plane network element based on the session information.

Optionally, the target intermediate session management network element obtains the information about the source session management network element from the mobility management network element.

Optionally, the mobility management network element is configured to obtain information about the target intermediate session management network element, and then send the information about the source session management network element to the target intermediate session management network element based on the information about the target intermediate session management network element.

In a possible implementation, the mobility management network element sends the first indication information to the target intermediate session management network element. The first indication information indicates the target intermediate session management network element to establish the forwarding tunnel from the source intermediate user plane network element to the target intermediate user plane network element, and the source intermediate user plane network element is a user plane network element that is controlled by the source session management network element and that is communicatively connected with the source base station.

Optionally, the mobility management network element determines that the forwarding tunnel needs to be established, and sends the first indication information to the target intermediate session management network element.

Optionally, the mobility management network element obtains the first indication information from the source session management network element, and sends the first indication information to the target intermediate session management network element.

Optionally, if the mobility management network element receives, from the source session management network element, a message used to trigger a service request procedure, the mobility management network element determines that the forwarding tunnel needs to be established.

In a possible implementation, the mobility management network element receives the session information from the source session management network element, and sends the session information to the target intermediate session management network element, such that the target intermediate session management network element establishes the tunnel between the target intermediate user plane network element and the anchor user plane network element.

Figure 1B:
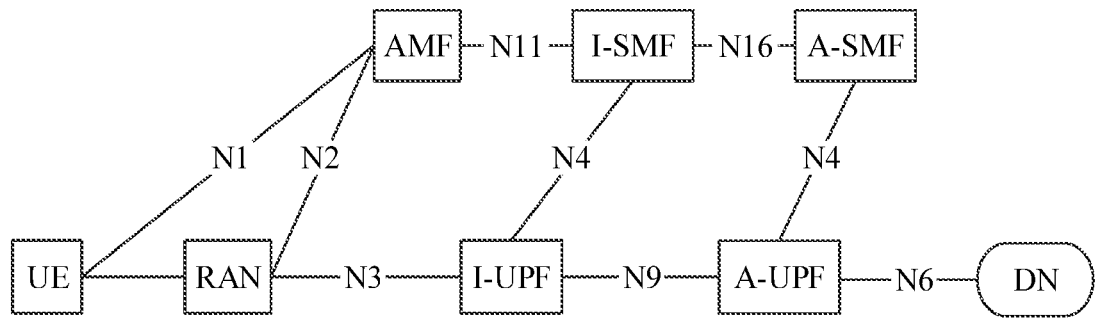
Figure 1C:
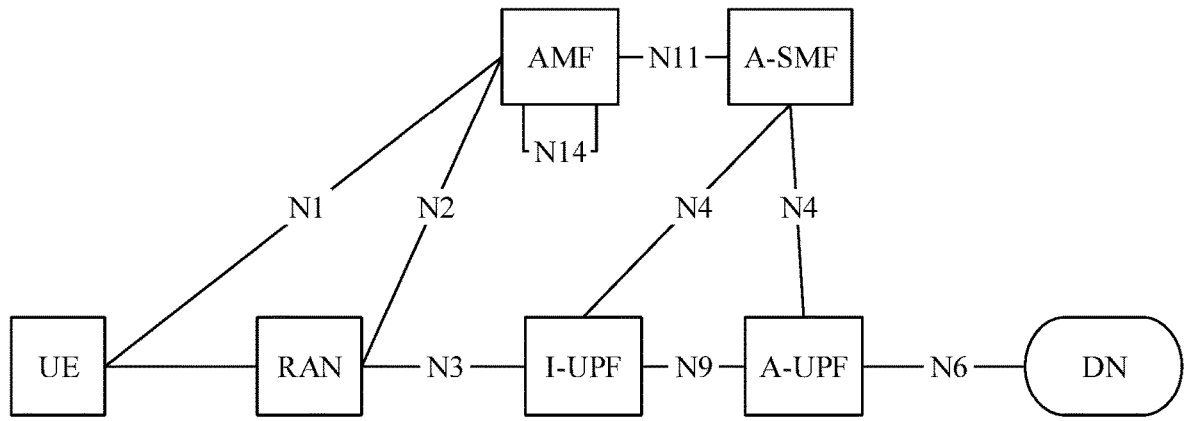

Based on the communications system shown in FIG. 1A, the embodiments of this application further provide schematic diagrams of another two possible network architectures of the communications system with reference to FIG. 1B and FIG. 1C. The communications systems shown in FIG. 1B and FIG. 1C each include an AMF entity, an SMF entity, and a UPF entity, and may further include a terminal device (for example in the figures, the terminal device is a UE), an device, and the like.

The source session management network element and the mobility management network element in FIG. 1A respectively correspond to an I-SMF and an AMF in FIG. 1B. The source intermediate user plane network element and the anchor user plane network element in FIG. 1A respectively correspond to an I-UPF and an A-UPF in FIG. 1B.

The source intermediate session network element and the mobility management network element in FIG. 1A respectively correspond to an A-SMF and an AMF in FIG. 1C. The source intermediate user plane network element and the anchor user plane network element in FIG. 1A respectively correspond to an I-UPF and an A-UPF in FIG. 1C.

It should be understood that although a target intermediate session management network element and a target intermediate user plane network element are not shown in FIG. 1B and FIG. 1C, the target intermediate session management network element and the target intermediate user plane network element are different from the SMF entities and the UPF entities in FIG. 1B and FIG. 1C, but are an SMF entity and a UPF entity in a service area to which the terminal device moves.

The communications system shown in FIG. 1B includes two SMF entities (an A-SMF entity and an I-SMF entity) and two UPF entities (an A-UPF entity and an I-UPF entity), and the UE is located in a service area of the I-SMF entity.

A network architecture shown in FIG. 1C includes one SMF entity, and the SMF entity controls the A-UPF entity connected to a data network. In this case, in FIG. 1C, the SMF entity is the A-SMF entity, and the UE is located in a service area of the A-SMF entity.

It should be noted that a RAN device, the SMF entity, the UPF entity, the AMF entity, and the like in FIG. 1B and FIG. 1C are merely names, and the names constitute no limitation on devices. In a 5G network and another future network, network elements corresponding to the RAN device, the SMF entity, the UPF entity, the AMF entity, and unified data management (UDM) may alternatively have other names. This is not specifically limited in the embodiments of this application.

In the network architectures shown in FIG. 1B and FIG. 1C, the RAN device communicates with the AMF entity through an N2 interface, the RAN device communicates with the UPF entity through an N3 interface, the UPF entity communicates with the SMF entity through an N4 interface, the UPF entities communicate with each other through an N9 interface, and the AMF entity communicate with the SMF entity through an N11 interface.

For ease of description, in this application, the communications systems shown in FIG. 1B and FIG. 1C are used as embodiments to describe the solutions of this application.

In the communications systems shown in FIG. 1B and FIG. 1C, one SMF entity may control a plurality of UPF entities. A set of locations of the plurality of UPF entities may form a service area of the SMF entity. The SMF entity controls the plurality of UPF entities, or in other words, the SMF entity may correspond to the plurality of UPF entities.

When the terminal device moves from a service area of an SMF entity on a current control plane path to a service area of another SMF entity, for ease of distinguishing between two different SMF entities, the SMF entity on the current control plane path is referred to as a source SMF entity, and an SMF entity in an area to which the terminal device moves is referred to as a target I-SMF entity. To ensure session continuity of the terminal device, a session needs to be re-established, and the terminal device needs to be handed over from the source SMF entity to the target I-SMF entity. However, currently, there is no solution for implementing handover between SMF entities. Therefore, this application provides a communication manner that is applicable to the system architectures shown in FIG. 1A to FIG. 1C, to implement handover between SMF entities.

The communications system shown in FIG. 1B includes two SMF entities: the I-SMF entity and the A-SMF entity. The terminal device is currently located in the service area of the I-SMF entity, and if the terminal device moves from the service area of the current I-SMF entity to a service area of another I-SMF entity, the source SMF entity is the I-SMF entity on the current control plane path, and the target I-SMF entity is an SMF entity in an area to which the terminal device moves. A source base station is an access network device on a current user plane path, and a target base station is an access network device that needs to be added to the user plane path after handover between SMF entities.

The communications system shown in FIG. 1C includes the A-SMF entity. The terminal device is currently located in the service area of the A-SMF entity, and if the terminal device moves from the service area of the current A-SMF entity to a service area of another SMF entity, an SMF entity needs to be inserted into the current control plane path as an I-SMF entity, the source SMF entity is the A-SMF entity, and the target I-SMF entity is the SMF entity that currently needs to be inserted. A source base station is an access network device on a current user plane path, and a target base station is an access network device that needs to be added to the user plane path after handover between SMF entities.

It should be noted that when the terminal device moves from a service area of the source SMF entity to a service area of the target I-SMF entity, the terminal device may be in a connected mode. In other words, a non-access stratum (NAS) signaling connection is maintained between the terminal device and the AMF. Alternatively, the terminal device may be in an idle mode. In other words, there is no NAS signaling connection between the terminal device and the AMF. The communications method provided in this application is applicable regardless of a mode of the terminal device.

Based on the network architectures of the communications systems shown in FIG. 1A, FIG. 1B, and FIG. 1C, for ease of description, only an example in which the source session management network element is the source SMF entity, the source user plane network element is the source I-UPF entity, the target intermediate session management network element is the target I-SMF entity, the target intermediate user plane network element is the target I-UPF entity, the anchor user plane network element is the A-UPF entity, and the mobility management network element is the AMF entity is used for description.

For example, the communications method provided in this application may include two processes: Process 1: Establish a forwarding tunnel from the source UPF entity to the target I-UPF entity. Process 2: Establish a tunnel between the target I-UPF entity and the A-UPF entity.

The following separately describes the foregoing two processes.

Process 1: Establish the forwarding tunnel from the source UPF entity to the target I-UPF entity.

The forwarding tunnel may be established in the following two communication manners:

Manner 1: The target I-SMF entity directly communicates and interacts with the source SMF entity.

Manner 2: The target I-SMF entity communicates and interacts with the source SMF entity using the AMF entity.

To clearly describe the communications method provided in this application, the following separately describes the two communication manners that may be used in the process 1.

Figure 2:
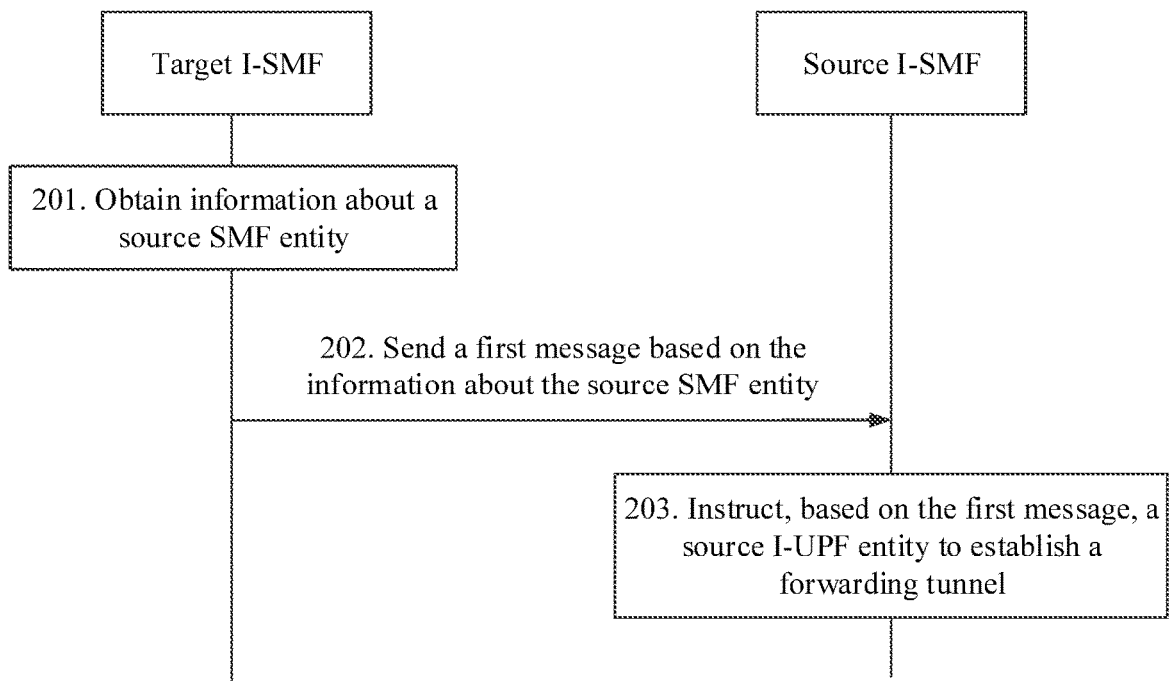
FIG. 2 is a schematic diagram of a communications method according to this application.

FIG. 2 shows a communications method according to an embodiment of this application. The first communication manner in the foregoing process 1 is used in this communications method. As shown in FIG. 2, a procedure of the method includes the following steps.

S201: The target I-SMF entity obtains information about the source SMF entity. The source SMF entity is an SMF entity that controls a UPF entity communicatively connected with a source base station.

S202: The target I-SMF entity sends a first message to the source SMF entity based on the information about the source SMF entity, and the source SMF entity receives the first message.

S203: The source SMF entity indicates, based on the first message, the source I-UPF entity to establish the forwarding tunnel.

The first message is used to establish the forwarding tunnel from the source I-UPF entity to the target I-UPF entity. The source I-UPF entity is a UPF entity that is controlled by the source SMF entity and that is communicatively connected with a source base station, and the target I-UPF entity is a UPF entity that is controlled by the target I-SMF entity and that is communicatively connected with a target base station.

To enable the target I-SMF entity to communicate with the source SMF entity, the target I-SMF entity first needs to obtain the information about the source SMF entity.

Optionally, the information about the source SMF entity may be address information of the source SMF entity, an identifier (ID) of the source SMF entity, or a fully qualified domain name (FQDN) of the source SMF entity. Any information that can be used to identify the source SMF entity is applicable to the information about the source SMF entity in this embodiment of this application. In this way, it can be ensured that the target I-SMF entity can determine the source SMF entity based on the information about the source SMF entity, and can interact with the source SMF entity.

After the target I-SMF entity obtains the information about the source SMF entity, the target I-SMF entity may determine that handover between SMF entities needs to be currently performed, and the forwarding tunnel needs to be established. In other words, the information about the source SMF entity may be used as a message for indicating to establish the forwarding tunnel. After obtaining the information about the source SMF entity, the target I-SMF entity determines that the forwarding tunnel needs to be established.

In a possible implementation, the source SMF entity determines that the forwarding tunnel needs to be established, and the source SMF entity may send first indication information to the target I-SMF entity. The first indication information indicates the target I-SMF entity to establish the forwarding tunnel.

After the target I-SMF entity obtains the first indication information from the source SMF entity, the target I-SMF entity may determine that the forwarding tunnel needs to be established.

For example, manners in which the source SMF entity determines that the forwarding tunnel needs to be established may include but are not limited to the following manners.

Manner 1: When the source SMF entity has downlink data to be sent to the terminal device, the source SMF entity determines that the forwarding tunnel needs to be established; or when the source I-UPF entity has downlink data to be sent to the terminal device, the source I-UPF entity sends a downlink data notification to the source SMF entity, and the source SMF entity may determine that downlink data needs to be sent to the terminal device currently, and determine that the forwarding tunnel needs to be established.

Manner 2: When the source SMF entity sends a request message used to request to establish a tunnel between a base station and the source I-UPF, the source SMF entity learns that a session needs to be handed over to the target I-SMF, and the source SMF entity determines that the forwarding tunnel needs to be established.

It should be noted that when the terminal device is in a connected mode, if the terminal device needs to be handed over between SMF entities, there is also handover between base stations, the target base station allocates indirect forwarding tunnel information corresponding to the target base station, sends the allocated indirect forwarding tunnel information corresponding to the target base station to the AMF entity, and then the AMF entity sends the indirect forwarding tunnel information to the target I-SMF entity. After receiving the indirect forwarding tunnel information, the target I-SMF entity may use the indirect forwarding tunnel information as a forwarding tunnel establishment indication, and the target I-SMF entity determines that the forwarding tunnel needs to be established.

When the terminal device is in an idle mode, if the source SMF entity or the source I-UPF entity has downlink data to be sent to the terminal device, the source SMF entity or the source I-UPF entity sends an N3 tunnel establishment message to the AMF, and the N3 tunnel establishment message triggers the AMF entity to indicate a base station to page the terminal device. After receiving the paging, the terminal device sends a service request message to the AMF entity. In other words, when the terminal device is in an idle mode, a service request procedure is triggered by the source SMF entity, or a service request procedure is triggered because the source SMF entity or the source I-UPF entity buffers the downlink data to be sent to the terminal device.

An indirect forwarding tunnel is a forwarding tunnel that is from the source base station through the source I-UPF and the target I-UPF to the target base station and that is established because data cannot be directly forwarded between the source base station and the target base station (in this embodiment of this application, for example, an device is a base station, and a source AN device and a target AN device are respectively a source base station and a target base station) when the terminal device is in a connected mode, to ensure that downlink data that has been sent to the source base station can be sent to the terminal device using the target base station. The indirect forwarding tunnel includes the forwarding tunnel from the source I-UPF to the target I-UPF.

When the terminal device is in an idle mode, if the source SMF entity or the source I-UPF entity has buffered downlink data to be sent to the terminal device, the service request procedure is triggered. Because the downlink data has been buffered in the source I-SMF or the source I-UPF, to ensure that the data buffered in the source I-SMF or the source I-UPF is sent to the terminal device, the forwarding tunnel from the source I-UPF to the target I-UPF also needs to be established.

When the target I-SMF entity determines that the forwarding tunnel needs to be established, the target I-SMF entity selects, from UPF entities controlled by the target I-SMF entity, a UPF entity as a target I-UPF entity, and indicates, according to the first indication information, the target I-UPF entity to establish the forwarding tunnel.

The target I-SMF entity may indicate, according to the first indication information in a plurality of manners, the target I-UPF entity to establish the forwarding tunnel. The following lists two manners.

Manner 1: The target I-SMF entity sends the first indication information to the target I-UPF entity.

Manner 2: The target I-SMF entity sends a second indication message to the target I-UPF entity, to indicate the target I-UPF entity to establish the forwarding tunnel.

Optionally, the first message may include forwarding tunnel information corresponding to the target I-UPF entity, for example, an Internet Protocol (IP) address or a tunnel identifier of the forwarding tunnel. The foregoing forwarding tunnel information is merely an example for description, and any information that can identify the forwarding tunnel may be used as the forwarding tunnel information.

The forwarding tunnel information corresponding to the target I-UPF entity may be determined by the target I-SMF entity, and used to indicate, in the first indication information or the second indication message sent to the target I-SMF entity, the target I-UPF entity to establish the forwarding tunnel based on the forwarding tunnel information corresponding to the target I-UPF entity. Alternatively, after the target I-UPF entity receives the first indication information or the second indication message, the target I-UPF entity determines the forwarding tunnel information corresponding to the target I-UPF entity and establishes the forwarding tunnel, and the target I-UPF entity sends the forwarding tunnel information to the target I-SMF.

The target I-SMF entity determines the first message used to establish the forwarding tunnel from the source I-UPF entity to the target I-UPF entity, and sends the first message to the source SMF entity.

Optionally, the first message may include the forwarding tunnel information corresponding to the target I-UPF entity corresponding to the forwarding tunnel. Alternatively, the first message may include indication information used to indicate whether the established forwarding tunnel is a part of the indirect forwarding tunnel.

After receiving the first message, the source SMF entity indicates, based on the first message, the source I-UPF entity to establish the forwarding tunnel.

Optionally, when indicating the source I-UPF entity to establish the forwarding tunnel, the source SMF entity may send, to the source I-UPF, the forwarding tunnel information corresponding to the target I-UPF in the first message.

Optionally, in a process in which the source SMF entity indicates the source I-UPF entity to establish the forwarding tunnel, the source SMF may obtain forwarding tunnel information corresponding to the source I-UPF.

For example, the source SMF may obtain, in the following two manners, the forwarding tunnel information corresponding to the source I-UPF. Manner 1: The source SMF allocates the forwarding tunnel information corresponding to the source I-UPF, and sends the forwarding tunnel information corresponding to the source I-UPF to the source I-UPF. Manner 2: The source SMF requests the source I-UPF to allocate the forwarding tunnel information corresponding to the source I-UPF, and receives the forwarding tunnel information corresponding to the source I-UPF allocated by the source I-UPF.

Optionally, after establishing the forwarding tunnel, the source I-UPF entity may send a message to the source SMF entity, to notify the source SMF entity that the forwarding tunnel is established. After determining that the forwarding tunnel is established, the source SMF entity may send a forwarding tunnel establishment complete response message to the target I-SMF entity, to notify the target I-SMF entity that the forwarding tunnel has been established.

Optionally, in the response message, the source SMF sends the forwarding tunnel information corresponding to the source I-UPF to the target I-SMF.

To save resources, after the forwarding tunnel is established, the target I-SMF entity and the source SMF entity may set forwarding tunnel release timers. When the forwarding tunnel release timers expire, the target I-SMF and the source SMF respectively indicate the target I-UPF and the source I-UPF to release the forwarding tunnel.

The target I-SMF entity may set the forwarding tunnel release timer when sending the first message; may set the forwarding tunnel release timer after receiving the response message fed back by the source SMF entity; or may set the forwarding tunnel release timer after indicating the target I-UPF entity to establish the forwarding tunnel. The foregoing manners of setting the forwarding tunnel release timer are all examples for description, and any manner in which the forwarding tunnel release timer may be set in a process of establishing the forwarding tunnel is applicable to this embodiment of this application.

When the forwarding tunnel release timer expires, the target I-SMF entity indicates the target I-UPF entity to release the forwarding tunnel.

The source SMF entity may set the forwarding tunnel release timer when obtaining the first message from the target I-SMF entity; may set the forwarding tunnel release timer after indicating the source I-UPF entity to establish the forwarding tunnel; or may set the forwarding tunnel release timer when sending the response message to the target I-SMF. The foregoing manners of setting the forwarding tunnel release timer are all examples for description, and any manner in which the forwarding tunnel release timer may be set in a process of establishing the forwarding tunnel is applicable to this embodiment of this application.

When the forwarding tunnel release timer expires, the source SMF entity indicates the source I-UPF entity to release the forwarding tunnel.

Figure 3:
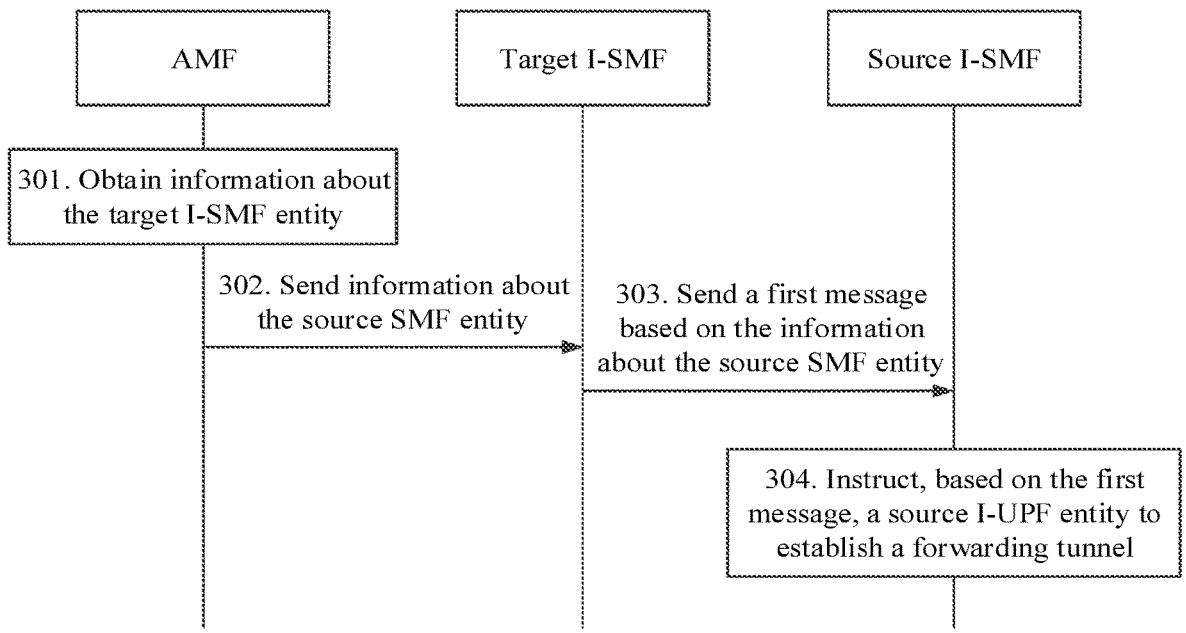
FIG. 3 is a schematic diagram of a communications method according to this application.

FIG. 3 shows a communications method according to an embodiment of this application. The second communication manner in the foregoing process 1 is used in this communications method. As shown in the figure, a procedure of the method includes the following steps.

S301: The AMF entity obtains information about the target I-SMF entity.

S302: The AMF entity sends information about the source SMF entity to the target I-SMF entity based on the information about the target I-SMF entity, and the target I-SMF entity receives the information about the source SMF entity.

S303: The target I-SMF entity sends a first message to the source SMF entity based on the information about the source SMF entity, and the source SMF entity receives the first message.

S304: The source SMF entity indicates, based on the first message, the source I-UPF entity to establish the forwarding tunnel.

The source SMF entity is an SMF entity that controls a UPF entity communicatively connected with a source base station, and the target I-SMF entity is an SMF entity that controls the target I-UPF entity communicatively connected with a target base station.

In the embodiment shown in FIG. 3, the same as the embodiment shown in FIG. 2, the target I-SMF entity also needs to obtain the information about the source SMF entity, and send the first message to the source SMF entity based on the information about the source SMF entity. After receiving the first message, the source SMF entity indicates, based on the first message, the source I-UPF entity to establish the forwarding tunnel. For a process, refer to the embodiment shown in FIG. 2, and repetitions are not described again.

In a possible implementation, the AMF entity sends first indication information to the target I-SMF entity, where the first indication information indicates the target I-SMF entity to establish the forwarding tunnel from the source I-UPF entity to the target I-UPF entity.

After the target I-SMF entity obtains the first indication information, the target I-SMF entity may determine that the forwarding tunnel needs to be established.

For example, the AMF entity sends the first indication information to the target I-SMF entity in many manners, and the following lists two manners for description.

Manner 1: The AMF entity determines that the forwarding tunnel needs to be established.

When determining that the forwarding tunnel needs to be established, the AMF entity generates the first indication information and sends the first indication information to the target I-SMF entity.

For example, if the AMF entity receives, from the source SMF entity, a message used to trigger a service request procedure, the AMF entity determines that the forwarding tunnel needs to be established.

When a session of the terminal device is not activated, an N3 tunnel between a base station corresponding to the session and the source I-UPF is not established in this case. If the source SMF entity or the source I-UPF has downlink data to be sent to the terminal device, the source SMF entity sends, to the AMF entity, a message for activating the session (namely, a request message for establishing the N3 tunnel). When the terminal device is currently located in a service area of the target I-SMF entity, the AMF entity determines that the forwarding tunnel needs to be established, and sends the first indication information to the target I-SMF entity. In this case, the source SMF entity triggers the service request procedure.

When obtaining the information about the target I-SMF entity, the AMF entity may first obtain location information of the terminal device. After determining, based on the location information of the terminal device, that the terminal device moves out of a service area of the source I-SMF entity, the AMF entity selects the target I-SMF entity based on the location information of the terminal device.

Optionally, when the AMF entity obtains the information about the target I-SMF entity, the source SMF entity may send the information about the target I-SMF entity to the AMF entity after selecting the target I-SMF entity.

Manner 2: The AMF entity obtains the first indication information from the source SMF entity.

The first indication information sent by the AMF entity to the target I-SMF entity may alternatively be forwarded by the source SMF entity to the target I-SMF entity using the AMF entity.

When determining that the forwarding tunnel needs to be established, the source SMF entity sends the first indication information to the AMF entity, where the first indication information indicates the target I-SMF entity to establish the forwarding tunnel.

For a manner in which the source SMF entity determines that the forwarding tunnel needs to be established, refer to the embodiment shown in FIG. 2. Details are not described herein again.

Then, a manner in which the target I-SMF entity determines that the forwarding tunnel needs to be established and establishes the forwarding tunnel, and a manner in which the source SMF entity establishes the forwarding tunnel based on the first message are the same as those in the embodiment shown in FIG. 2. Details are not described herein again.

To save resources, after the forwarding tunnel is established, the target I-SMF entity and the source SMF entity may set forwarding tunnel release timers. When the forwarding tunnel release timers expire, the forwarding tunnel is released. For descriptions of the forwarding tunnel release timer, refer to the embodiment shown in FIG. 2. Details are not described herein again.

Process 2: Establish a tunnel between the target I-UPF entity and the A-UPF entity.

The tunnel between the target I-UPF entity and the A-UPF entity may be established in the following two communication manners.

Manner 1: The target I-SMF entity directly communicates and interacts with the source SMF entity.

Manner 2: The target I-SMF entity communicates and interacts with the source SMF entity using the AMF entity.

To clearly describe the communications method provided in this application, the following separately describes two communication manners that may be used in the process 2.

Figure 4:
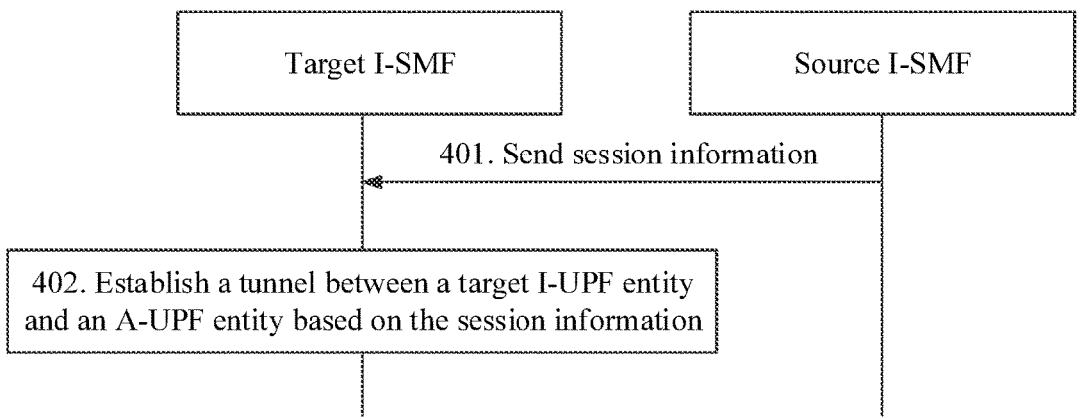
FIG. 4 is a schematic diagram of a communications method according to this application.

FIG. 4 shows a communications method according to an embodiment of this application. The first communication manner in the foregoing process 2 is used in this communications method. As shown in FIG. 4, a procedure of the method includes the following steps.

S401: The source SMF entity sends session information to the target I-SMF entity, and the target I-SMF entity obtains the session information from the source SMF entity.

S402: The target I-SMF entity establishes the tunnel between the target I-UPF entity and the A-UPF entity based on the session information.

The session information includes at least one of the following: uplink tunnel information of the A-UPF entity or information about the A-SMF entity. The A-SMF entity is an SMF entity that controls the A-UPF entity.

The target I-SMF entity may determine address information of the source SMF entity based on information about the source SMF entity, and may send, to the source SMF entity based on the address information of the source SMF entity, a message used to request the session information.

After receiving the message used to request the session information, the source SMF entity sends the session information to the target I-SMF entity.

After receiving the session information, the target I-SMF entity may establish the tunnel between the target I-UPF entity and the A-UPF entity.

The session information may be session context information. The session information includes at least one of the uplink tunnel information of the A-UPF entity or the information about the A-SMF entity. When the session information includes the uplink tunnel information of the A-UPF entity, the target I-SMF entity may send the uplink tunnel information of the A-UPF entity to the target I-UPF entity, and establish an uplink tunnel between the target I-UPF entity and the A-UPF entity. When the session information includes the information about the A-SMF entity, the target I-SMF entity may send downlink tunnel information of the target I-UPF to the A-SMF entity, and the A-SMF entity sends the downlink tunnel information of the target I-UPF entity to the A-UPF entity, to establish a downlink tunnel from the A-UPF to the I-UPF.

Figure 5:
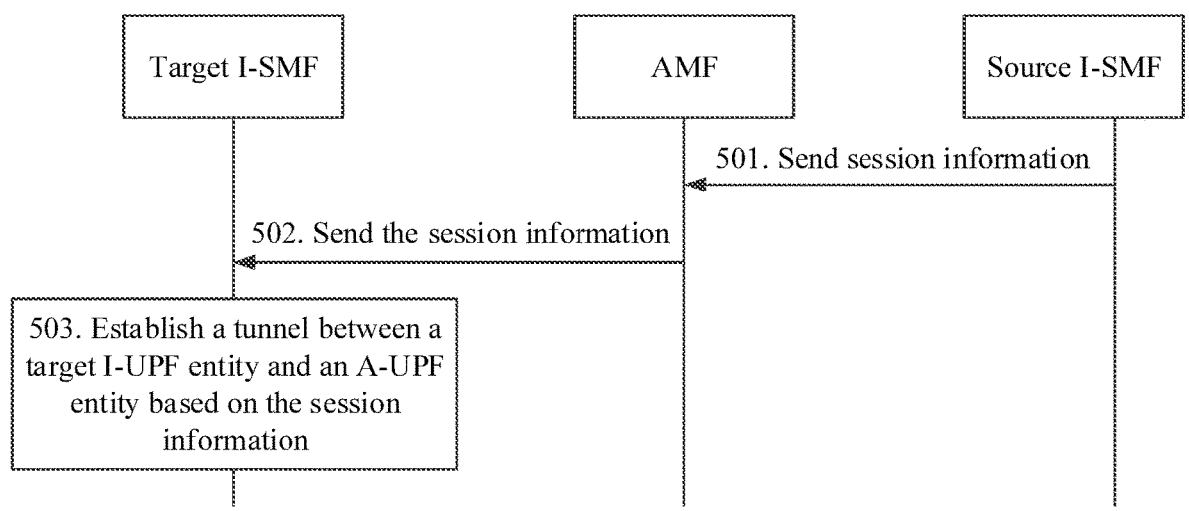
FIG. 5 is a schematic diagram of a communications method according to this application.

FIG. 5 shows a communications method according to an embodiment of this application. The second communication manner in the foregoing process 2 is used in this communications method. As shown in FIG. 5, a procedure of the method includes the following steps.

S501: The source SMF entity sends session information to the AMF entity, and the AMF entity receives the session information.

S502: The AMF entity sends the session information to the target I-SMF entity, and the target I-SMF entity receives the session information.

S503: The target I-SMF entity establishes the tunnel between the target I-UPF entity and the A-UPF entity based on the session information.

The session information includes at least one of the following: uplink tunnel information of the A-UPF entity or information about the A-SMF entity. The A-SMF entity is an SMF entity that controls the A-UPF entity.

Optionally, the session information may be encapsulated in a transparent container, and the AMF entity may not parse the session information in the transparent container.

In the embodiment shown in FIG. 5, the AMF entity has a forwarding function, and sends session information of the source SMF entity to the target I-SMF entity. For descriptions of the session information, refer to the embodiment shown in FIG. 4. Details are not described herein again.

It should be noted that in the foregoing two processes, the target I-SMF entity needs to obtain the information about the source SMF entity, and may obtain the information about the source SMF entity in a plurality of manners. For example, the information about the source SMF entity may be pre-stored in the AMF entity, and when handover between SMF entities needs to be performed, the AMF entity sends the information about the source SMF entity to the target I-SMF entity. Alternatively, the source SMF entity may send the information about the source SMF entity to the AMF entity, and then the AMF entity forwards the information about the source SMF entity to the target I-SMF entity. The information about the source SMF entity and other session information are encapsulated together in a transparent container.

It should be understood that the two communication manners in the process 1 and the two communication manners in the process 2 may be combined at random. For example, the forwarding tunnel is established using the communications method shown in FIG. 2, and the tunnel between the target I-UPF entity and the A-UPF entity is established using the communications method shown in FIG. 4. For another example, the forwarding tunnel is established using the communications method shown in FIG. 3, and the tunnel between the target I-UPF entity and the A-UPF entity is established using the communications method shown in FIG. 5. For still another example, the forwarding tunnel is established using the communications method shown in FIG. 2, and the tunnel between the target I-UPF entity and the A-UPF entity is established using the communications method shown in FIG. 4.

It should be noted that the process 1 and the process 2 may be simultaneously performed or may be successively performed.

When sending information to the AMF entity or the target I-SMF entity, the source SMF entity may add a plurality of pieces of information to one piece of signaling for sending. For example, when sending the session information to the AMF entity or the target I-SMF entity, the source SMF entity may add the information about the source SMF entity to the session information, or may add the first indication information to the session information, or may add both the information about the source SMF entity and the first indication information to the session information.

When sending information to the target I-SMF entity, the AMF entity may add a plurality of pieces of information to one piece of signaling for sending. For example, when sending the session information to the target I-SMF entity, the AMF entity may add the information about the source SMF entity to the session information, or may add the first indication information to the session information, or may add both the information about the source SMF entity and the first indication information to the session information.

The communications methods shown in FIG. 2 to FIG. 5 in the embodiments of this application are applied to example scenarios below, and the communications methods in this application are further described using Embodiment 1 to Embodiment 4 below.

Figure 6:
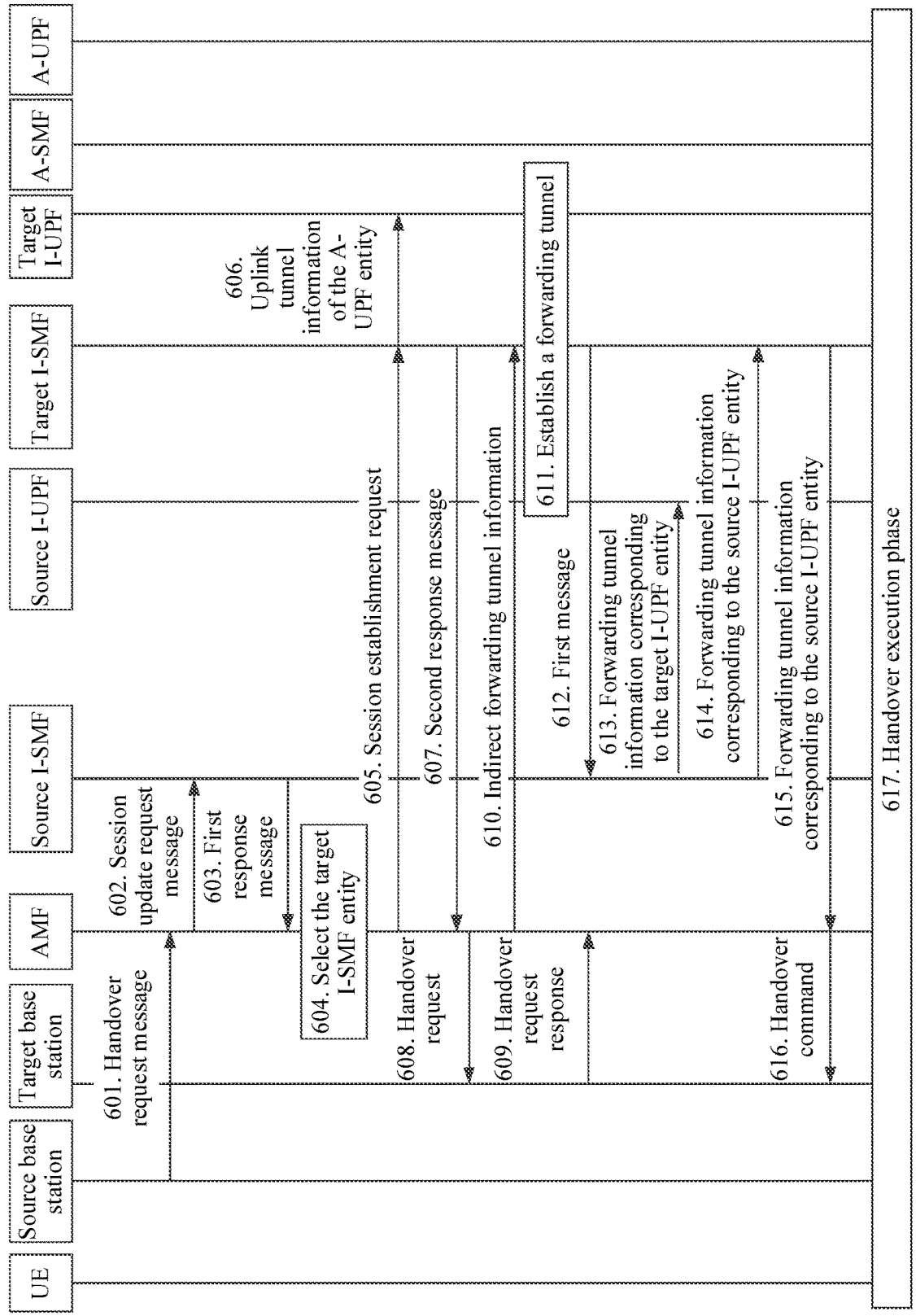
FIG. 6 is a flowchart of a communications method according to this application.

Embodiment 1 is applied to the network architecture shown in FIG. 1B. A source SMF entity is a source I-SMF entity, and when UE is in a connected mode, the UE moves out of a service area of the source I-SMF entity and moves into a service area of a target I-SMF entity. As shown in FIG. 6, a procedure of Embodiment 1 includes the following steps.

S601: A source base station sends a handover request message to an AMF entity, and the AMF entity receives the handover request message. The handover request message includes a session identifier (for example, a PDU Session ID) of a session to be handed over, a session management (SM) N2 request message corresponding to the session to be handed over, and location information of the UE. The SM N2 request message corresponding to the session to be handed over indicates whether a forwarding tunnel needs to be established during handover of the session and whether the forwarding tunnel needs to pass through a core network.

S602: The AMF entity determines, based on the session identifier of the session to be handed over, the source I-SMF entity corresponding to the session, the AMF entity sends a session update request message to the source I-SMF entity, and the source I-SMF entity receives the session update request message. The AMF entity sends, to the source I-SMF entity, the session identifier of the session to be handed over, the SM N2 message corresponding to the session to be handed over, and the location information of the UE in the session update request message.

S603: The source I-SMF entity determines, based on the location information of the UE and the service area of the source I-SMF entity, whether the UE moves out of the service area of the source I-SMF entity. If the UE moves out of the service area of the source I-SMF entity, the source I-SMF entity sends a first response message to the AMF entity, and the AMF entity receives the first response message.

The first response message may include indication information used to indicate the AMF entity to select the target I-SMF entity, or may include information about the target I-SMF entity. The target I-SMF entity is selected by the source I-SMF entity based on the location information of the UE.

The first response message further includes session information, and the session information includes at least one of uplink tunnel information of an A-UPF entity and information about an A-SMF.

Optionally, the session information further includes information about the source I-SMF entity (for example, identification information of the source I-SMF entity or address information of the source I-SMF entity).

In an implementation, the source I-SMF entity may encapsulate the session information in a transparent container, and send the transparent container to the AMF entity. The AMF entity may forward the transparent container to the target I-SMF entity without parsing content in the transparent container.

Optionally, if the source I-SMF entity receives the SM N2 message that is corresponding to the session to be handed over and that is sent by the AMF entity, because the AMF entity does not store the SM N2 message, the source I-SMF entity may also send the SM N2 message to the AMF entity when sending the first response message.

S604: If the AMF entity receives the indication information used to indicate the AMF entity to select the target I-SMF entity, the AMF entity selects the target I-SMF entity based on the location information of the UE.

S605: The AMF entity sends a session establishment request to the target I-SMF entity, and sends, to the target I-SMF entity, the SM N2 request message corresponding to the session to be handed over, the location information of the UE, and the session information obtained from the source I-SMF entity. The target I-SMF entity receives the session establishment request, and obtains the SM N2 request message corresponding to the session to be handed over, the location information of the UE, and the session information obtained from the source I-SMF entity.

Optionally, the AMF entity sends the information about the source I-SMF entity to the target I-SMF entity.

S606: The target I-SMF entity selects a target I-UPF entity based on the location information of the UE, and sends the uplink tunnel information of the A-UPF entity in the session information to the target I-UPF entity. The target I-UPF entity receives the uplink tunnel information of the A-UPF entity, and establishes an uplink tunnel from the target I-UPF entity to the A-UPF entity based on the uplink tunnel information of the A-UPF entity.

In S606, the uplink tunnel from the target I-UPF entity to the A-UPF entity is established. After the UE is handed over to a target base station, the I-UPF entity may send, to the A-UPF entity through the uplink tunnel, an uplink data packet of the UE received from the target base station.

During implementation, in S606, the target I-SMF entity may further indicate the I-UPF entity to establish an N3 uplink tunnel and a downlink tunnel from the target I-UPF entity to an N9 interface. After S606, the target I-SMF entity obtains information about the N3 interface uplink tunnel of the target I-UPF entity and information about the downlink tunnel from the target I-UPF entity to the N9 interface.

Optionally, the target I-SMF determines, based on an indication that is in the SM N2 request message and that indicates whether the forwarding tunnel needs to be established and whether the forwarding tunnel needs to pass through the core network, whether an indirect forwarding tunnel may be established.

S607: The target I-SMF entity sends a second response message to the AMF entity, and the AMF entity receives the second response message. The second response message includes an SM N2 response message sent by the target I-SMF entity to the target base station, and the SM N2 response message includes the N3 uplink tunnel information of the target I-UPF entity and an indication indicating whether the indirect forwarding tunnel is supported.

S608: The AMF entity sends a handover request to the target base station, and sends, to the target base station in the handover request, the SM N2 response message sent by the target I-SMF entity to the target base station. The target base station receives the handover request and obtains the SM N2 response message.

S609: The target base station sends a handover request response to the AMF entity, and the AMF entity receives the handover request response. If the indirect forwarding tunnel needs to be established, the target base station allocates indirect forwarding tunnel information and sends the indirect forwarding tunnel information to the AMF entity, and the AMF entity receives the indirect forwarding tunnel information.

S610: The AMF entity sends the indirect forwarding tunnel information of the target base station to the target I-SMF entity, and the target I-SMF entity receives the indirect forwarding tunnel information.

S611: The target I-SMF entity determines, based on the indirect forwarding tunnel information sent by the target base station, that the indirect forwarding tunnel needs to be established. The target I-SMF entity sends the indirect forwarding tunnel information of the target base station to the target I-UPF entity, and indicates the target I-UPF to establish the indirect forwarding tunnel. The indirect forwarding tunnel includes a downlink forwarding tunnel established from the target I-UPF entity to the target base station and the forwarding tunnel. The target I-UPF receives the indirect forwarding tunnel information and establishes the indirect forwarding tunnel.

Optionally, the target I-SMF entity allocates indirect forwarding tunnel information corresponding to the target I-UPF, and sends the indirect forwarding tunnel information corresponding to the target I-UPF to the target I-UPF. Alternatively, the target I-SMF entity requests the target I-UPF to allocate indirect forwarding tunnel information, and the target I-UPF sends the indirect forwarding tunnel information to the target I-SMF.

In S611, the target I-SMF entity obtains the forwarding tunnel information of the target I-UPF entity, and adds the forwarding tunnel information corresponding to the target I-UPF entity to a first message. The forwarding tunnel information of the target I-UPF entity may be allocated by the target I-SMF entity, or may be allocated by the target I-UPF entity. Optionally, the first message may further include an indirect forwarding tunnel indication used to indicate that a forwarding tunnel from a source I-UPF to the target I-UPF is a part of the indirect forwarding tunnel.

S612: The target I-SMF entity obtains address information of the source I-SMF entity based on the received information about the source I-SMF entity, for example, a uniform resource locator (URL) corresponding to a session service, and sends the first message to the source I-SMF entity. The first message is used to request the source I-SMF entity to establish the forwarding tunnel from the source I-UPF entity to the target I-UPF entity. The target I-SMF entity sends the indirect forwarding tunnel information corresponding to the target I-UPF entity to the source I-SMF entity, and the source I-SMF entity receives the first message and the indirect forwarding tunnel information corresponding to the target I-UPF entity.

S613: The source I-SMF entity sends the forwarding tunnel information corresponding to the target I-UPF entity to the source I-UPF entity, and requests the source I-UPF entity to establish the forwarding tunnel. The source I-UPF entity receives the forwarding tunnel information corresponding to the target I-UPF entity and establishes the forwarding tunnel.

Optionally, the source I-SMF obtains, based on the indirect forwarding tunnel indication in the first message, indirect forwarding tunnel information corresponding to the source I-UPF entity. The source I-SMF entity allocates the indirect forwarding tunnel information corresponding to the source I-UPF and sends the indirect forwarding tunnel information corresponding to the source I-UPF to the source I-UPF. Alternatively, the source I-SMF entity requests the source I-UPF to allocate the indirect forwarding tunnel information, and the source I-UPF sends the indirect forwarding tunnel information to the source I-SMF.

S614: The source I-SMF entity sends the forwarding tunnel information corresponding to the source I-UPF entity to the target I-SMF entity, and the target I-SMF entity receives the forwarding tunnel information corresponding to the source I-UPF entity.

S615: The target I-SMF entity sends the forwarding tunnel information corresponding to the source I-UPF entity to the AMF entity, and the AMF entity receives the forwarding tunnel information corresponding to the source I-UPF entity.

S616: The AMF entity sends a handover command to the source base station. The handover command carries the forwarding tunnel information corresponding to the source I-UPF entity. The source base station receives the handover command and obtains the forwarding tunnel information corresponding to the source I-UPF entity.

A handover preparation phase ends herein. In the handover preparation phase, an indirect forwarding tunnel between the target base station and the base station is established, and a path of the indirect forwarding tunnel is as follows: the source base station->the source I-UPF entity->the target I-UPF entity->the target base station.

S617: After the handover preparation is completed, a handover execution process is to be performed. In the handover process, an air interface of the UE is handed over from the source base station to the target base station, and a downlink tunnel of the A-UPF entity is handed over from the source I-UPF entity to the target I-UPF entity. For details of the handover execution process, refer to 5G-related protocols. Details are not described in this embodiment of this application.

Embodiment 2: In Embodiment 1, the source SMF entity selects the target I-SMF entity or the source SMF entity indicates the AMF entity to select the target I-SMF entity. Alternatively, the AMF entity may select the target I-SMF entity without a need of an indication sent by the source SMF entity. Embodiment 2 provides a manner in which the AMF entity selects the target I-SMF entity.

In Embodiment 2, two manners of obtaining session information are further provided.

Manner 1: The AMF entity obtains the session information from a source I-SMF entity, and sends the session information to the target I-SMF entity.

Manner 2: The AMF entity sends information about a source I-SMF entity to the target I-SMF entity, and the target I-SMF entity obtains the session information from the source I-SMF entity.

Figure 7A:
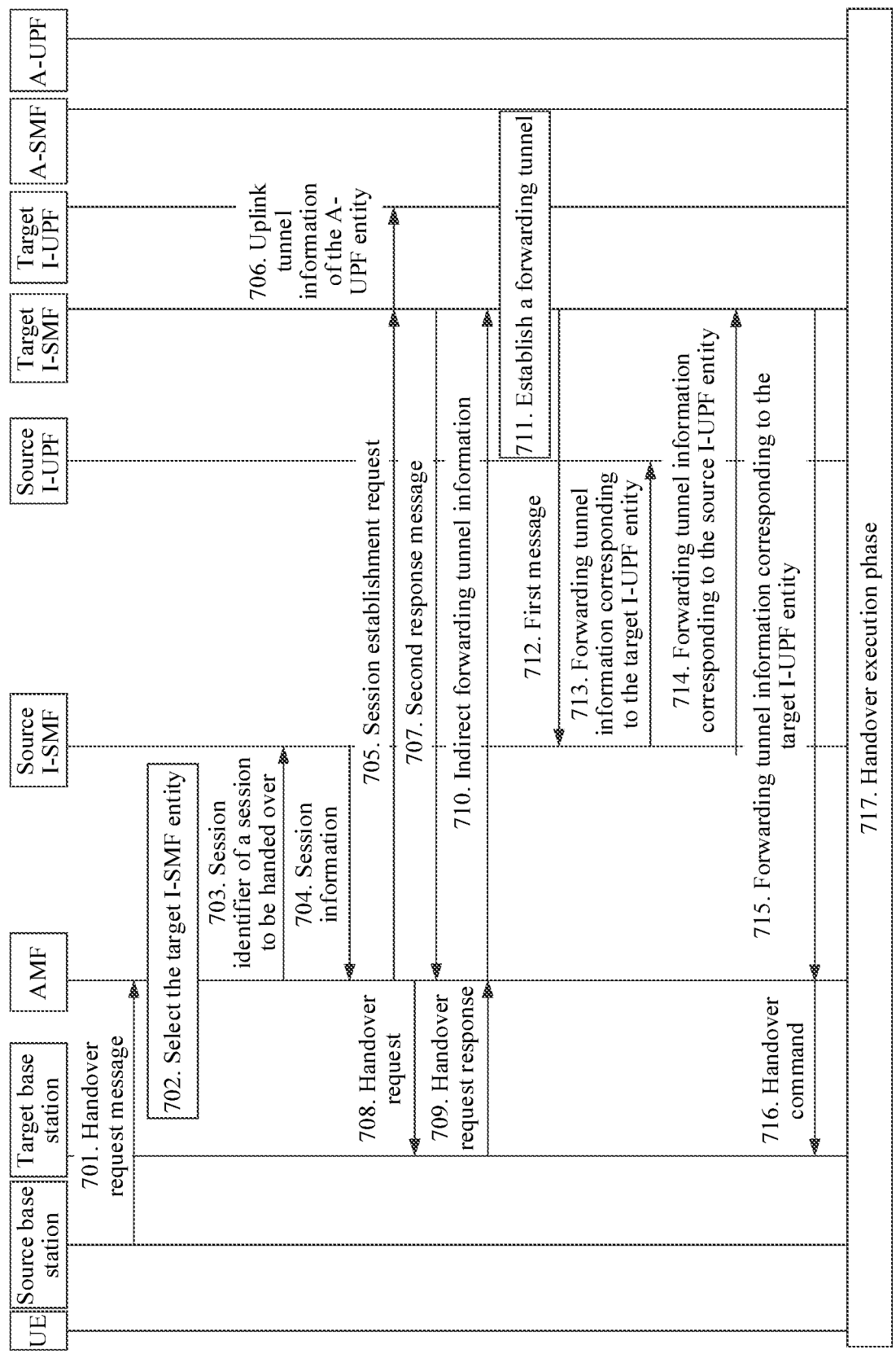
FIG. 7A and FIG. 7B are flowcharts of a communications method according to this application.

FIG. 7A shows a communications method according to an embodiment of this application. In the communications method, the first manner of obtaining the session information is used. As shown in the figure, a procedure of the method includes the following steps.

S701: Same as S601 in Embodiment 1.

S702: The AMF entity selects the target I-SMF entity based on a service area of the source I-SMF entity and location information of UE.

Information about the service area of the source I-SMF entity may be configured on the AMF entity. Alternatively, information about the service area of the source I-SMF entity may be configured on a network repository function (NRF) entity, and the AMF entity obtains the information about the service area of the source I-SMF entity from the NRF entity.

S703: After the AMF entity selects the target I-SMF entity, the AMF entity sends, to the source I-SMF entity, a session identifier of a session to be handed over, to request the source I-SMF entity to send the session information to the AMF entity.

The session information includes at least one of uplink tunnel information of an A-UPF entity and information about an A-SMF.

S704: The source I-SMF entity sends the session information to the AMF entity.

Optionally, the session information further includes information about the source I-SMF entity, for example, address information or identification information of the source I-SMF entity. The source I-SMF entity may encapsulate the session information in a transparent container, send the transparent container to the AMF entity, and send the transparent container to the target I-SMF entity using the AMF entity.

S705: The AMF entity sends a session establishment request to the target I-SMF entity, and sends, to the target I-SMF entity, the session information received from the source I-SMF entity.

Optionally, the AMF entity sends the information about the source I-SMF entity to the target I-SMF entity.

S706 to S717 are the same as S606 to S617 in Embodiment 1, and details are not described herein again.

Figure 7B:
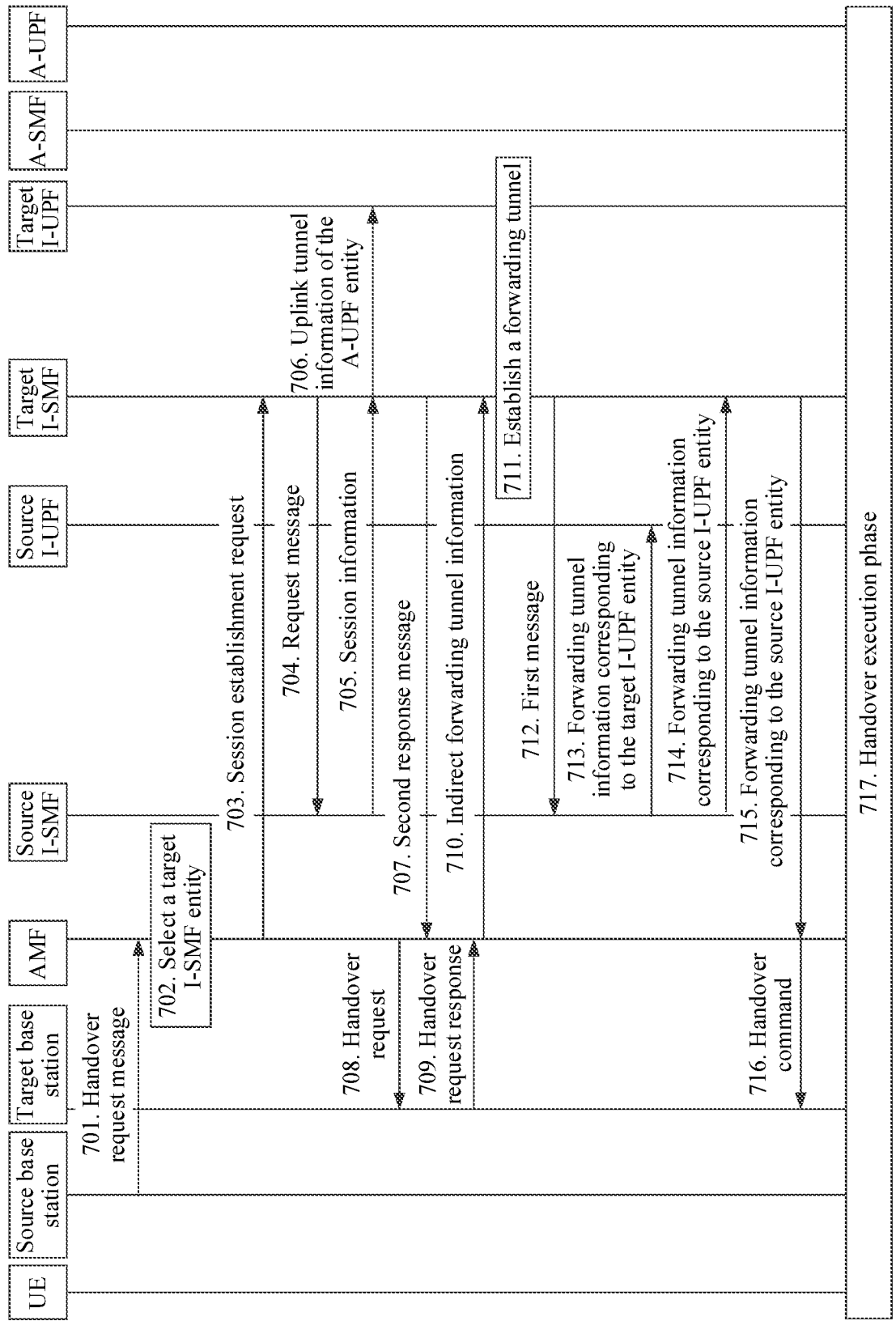

FIG. 7B shows a communications method according to an embodiment of this application. In the communications method, the second manner of obtaining the session information is used. As shown in the figure, a procedure of the method includes the following steps.

S701: Same as S601 in Embodiment 1.

S702: The AMF entity selects the target I-SMF entity based on a service area of the source I-SMF entity and location information of UE.

The service area of the source I-SMF entity may be configured on the AMF entity. Alternatively, information about the service area of the source I-SMF entity may be configured on an NRF entity, and the AMF entity obtains the service area of the source I-SMF entity from the NRF entity.

S703: After selecting the target I-SMF entity, the AMF entity sends a session establishment request to the target I-SMF entity and sends information about the source I-SMF entity to the target I-SMF entity. The target I-SMF entity receives the session establishment request and obtains the information about the source I-SMF entity.

S704: The target I-SMF entity determines address information of the source I-SMF entity based on the information about the source I-SMF entity, and sends a request message to the source I-SMF entity to request the session information.

The session information includes at least one of uplink tunnel information of an A-UPF entity or information about an A-SMF.

S705: The source I-SMF entity receives the request message, and the source I-SMF entity sends the session information to the target I-SMF entity.

S706 to S717 are the same as S606 to S617 in Embodiment 1, and details are not described herein again.

Embodiment 3 is applied to the network architecture shown in FIG. 1B. When UE is in an idle mode, the UE needs to be handed over between SMF entities in a service request process. In Embodiment 3, a target I-SMF entity also needs to obtain information about a source I-SMF entity. For a method for obtaining the information about the source I-SMF entity by the target I-SMF entity, refer to Embodiment 1 and Embodiment 2. Optionally, the target I-SMF entity may further obtain session information. For a method for obtaining the session information by the target I-SMF entity, refer to Embodiment 1 and Embodiment 2.

In Embodiment 3, when receiving first indication information, the target I-SMF entity determines that a forwarding tunnel needs to be established. In Embodiment 3, the first indication information may be sent by an AMF entity to the target I-SMF entity, or may be sent by the source I-SMF entity to the target I-SMF entity using an AMF entity.

Figure 8:
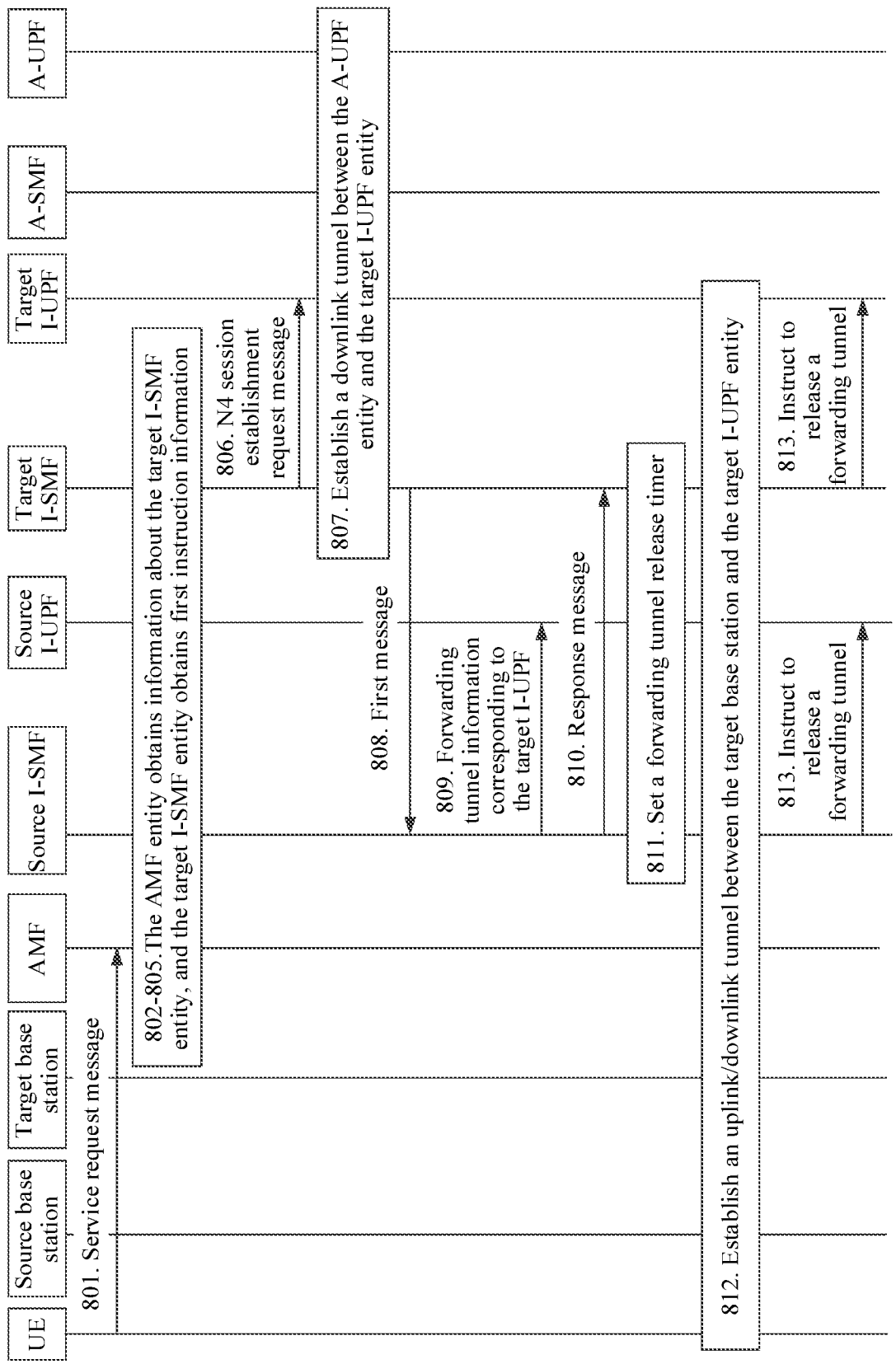
FIG. 8 is a flowchart of a communications method according to this application.

As shown in FIG. 8, an embodiment of this application provides a communications method. A procedure of the method includes the following steps.

S801: The UE sends a service request message to the AMF entity. The message includes a session identifier of a to-be-activated session and location information of the UE. The AMF entity receives the service request message.

S802 to S805: The AMF entity obtains information about the target I-SMF entity and sends a session establishment request to the target I-SMF entity. The target I-SMF entity obtains information about the source I-SMF entity and first indication information.

Optionally, the target I-SMF entity may further obtain session information in S802 to S805. Methods in which the AMF entity obtains the information about the target I-SMF entity, the target I-SMF entity obtains the information about the source I-SMF entity, and the target I-SMF entity obtains the session information are the same as those in Embodiment 1 and Embodiment 2. Details are not described again.

The target I-SMF entity obtains the first indication information in the following two manners.

(1) The source I-SMF entity determines whether a forwarding tunnel needs to be established.

The source I-SMF entity may determine, depending on whether a service request procedure is triggered, whether the forwarding tunnel needs to be established. If the source I-SMF triggers the service request procedure, it is determined that the forwarding tunnel needs to be established. Alternatively, the source I-SMF entity may determine, depending on whether the source I-SMF entity or a source I-UPF entity buffers downlink data to be sent to the UE, whether the forwarding tunnel needs to be established. If the source I-SMF entity or the source I-UPF entity buffers the downlink data to be sent to the UE, the source I-SMF entity determines that the forwarding tunnel needs to be established.

In this manner, the source I-SMF entity needs to send the first indication information. For example, when the AMF entity may obtain the session information from the source I-SMF entity (for example, S602 and S603 shown in FIG. 6, and S703 and S704 shown in FIG. 7A), the source I-SMF entity adds the first indication information to the session information and sends the session information to the AMF entity. Then, the AMF entity sends the first indication information to the target I-SMF entity in the session establishment request (for example, S605 shown in FIG. 6 and S705 shown in FIG. 7A).

The first indication information and the session information may be encapsulated in a transparent container, and sent to the target I-SMF entity using the AMF entity. The AMF entity does not need to parse content in the transparent container.

If the target I-SMF entity directly obtains the session information from the source I-SMF entity (for example, S704 and S705 shown in FIG. 7B), the source I-SMF entity may directly send the first indication information to the target I-SMF entity.

(2) The AMF entity determines whether a forwarding tunnel needs to be established.

The AMF entity may determine, depending on whether the source I-SMF entity corresponding to the session triggers a service request procedure, whether the forwarding tunnel needs to be established. When the source I-SMF entity corresponding to the session triggers the service request procedure, the AMF entity determines that the forwarding tunnel needs to be established. For example, when receiving a message used by the source SMF entity to trigger the service request procedure, the AMF entity determines that the forwarding tunnel needs to be established.

When determining that the forwarding tunnel needs to be established, the AMF entity needs to send the first indication information to the target I-SMF entity. For example, the AMF entity may add the first indication information to the session establishment request when sending the session establishment request to the target I-SMF entity (for example, S605 shown in FIG. 6, S705 shown in FIG. 7A, and S703 shown in FIG. 7B).

S806: The target I-SMF entity selects a target I-UPF entity based on the location information of the UE. After receiving the first indication information, the target I-SMF entity adds the first indication information or second indication information to an N4 session establishment request message to be sent to the target I-UPF entity, to indicate the target I-UPF entity to establish the forwarding tunnel. The target I-UPF entity receives the N4 session establishment request message and obtains the first indication information or the second indication information.

In S806, the target I-SMF entity obtains forwarding tunnel information corresponding to the target I-UPF entity, and adds the forwarding tunnel information corresponding to the target I-UPF entity to a first message.

The target I-SMF entity may obtain the forwarding tunnel information corresponding to the target I-UPF entity in the following two manners. Manner 1: The target I-SMF entity allocates the forwarding tunnel information corresponding to the target I-UPF entity and sends the forwarding tunnel information corresponding to the target I-UPF entity to the target I-UPF. Manner 2: The target I-SMF requests the target I-UPF entity to allocate the forwarding tunnel information corresponding to the target I-UPF entity, and the target I-UPF sends the forwarding tunnel information to the target I-SMF.

If the target I-SMF entity obtains the session information in S802 to the S805, and the session information includes uplink tunnel information of an A-UPF entity, the target I-SMF entity sends the uplink tunnel information of the A-UPF entity to the target I-UPF entity in S806, and establishes a tunnel between the target I-UPF entity and the A-UPF entity.

S807: The target I-SMF entity interacts with an A-SMF entity, and establishes a downlink tunnel between the A-UPF entity and the target I-UPF entity.

S808: If the target I-SMF entity receives the first indication information, the target I-SMF entity determines address information of the source I-SMF entity based on the information about the source I-SMF entity, and sends the first message to the source I-SMF entity. The first message includes the forwarding tunnel information corresponding to the target I-UPF. The source I-SMF entity receives the first message.

Optionally, the first message further includes a non-indirect forwarding tunnel indication used to indicate that the forwarding tunnel is not a part of an indirect forwarding tunnel.

S809: The source I-SMF entity sends the forwarding tunnel information corresponding to the target I-UPF to the source I-UPF entity, to indicate to establish a forwarding tunnel from the source I-UPF entity to the target I-UPF entity. The source I-UPF entity receives the forwarding tunnel information corresponding to the target I-UPF, and establishes the forwarding tunnel from the source I-UPF entity to the target I-UPF entity.

S810: The source I-SMF entity sends a response message to the target I-SMF entity after establishing the forwarding tunnel, and the target I-SMF entity receives the response message and determines that the source I-SMF has established the forwarding tunnel.

S811: The source I-SMF entity and the target I-SMF entity each set a forwarding tunnel release timer.

S812: The target I-SMF entity interacts with a target base station using the AMF entity, and establishes an uplink/downlink tunnel between the target base station and the target I-UPF entity. For an implementation, refer to descriptions of an existing protocol. Details are not described in this embodiment of this application.

S813: When the forwarding tunnel release timers expire, the source I-SMF entity indicates the source I-UPF entity to release the forwarding tunnel, and the target I-SMF entity indicates the target I-UPF entity to release the forwarding tunnel.

It should be noted that, S807 may be performed after S809. To be more specific, the forwarding tunnel between the source I-UPF and the target I-UPF is first established, and then a tunnel between the target I-UPF and the A-UPF is established. Alternatively, S807 may be performed before step 806. To be more specific, the downlink tunnel from the A-UPF to the target I-UPF is established before the uplink tunnel from the target I-UPF to the A-UPF is established. This is not limited in this embodiment of this application.

Embodiment 4 is applied to the network architecture shown in FIG. 1C. A source SMF entity is an A-SMF entity, and UE moves out of a service area of the A-SMF entity, and moves into a service area of a target I-SMF entity. The target I-SMF needs to be inserted into a control plane path of the UE. In Embodiment 4, the target I-SMF entity also needs to obtain information about the A-SMF entity. For a method for obtaining the information about the A-SMF entity by the target I-SMF entity, refer to the methods for obtaining the information about the source I-SMF entity in Embodiment 1 and Embodiment 2.

Figure 9:
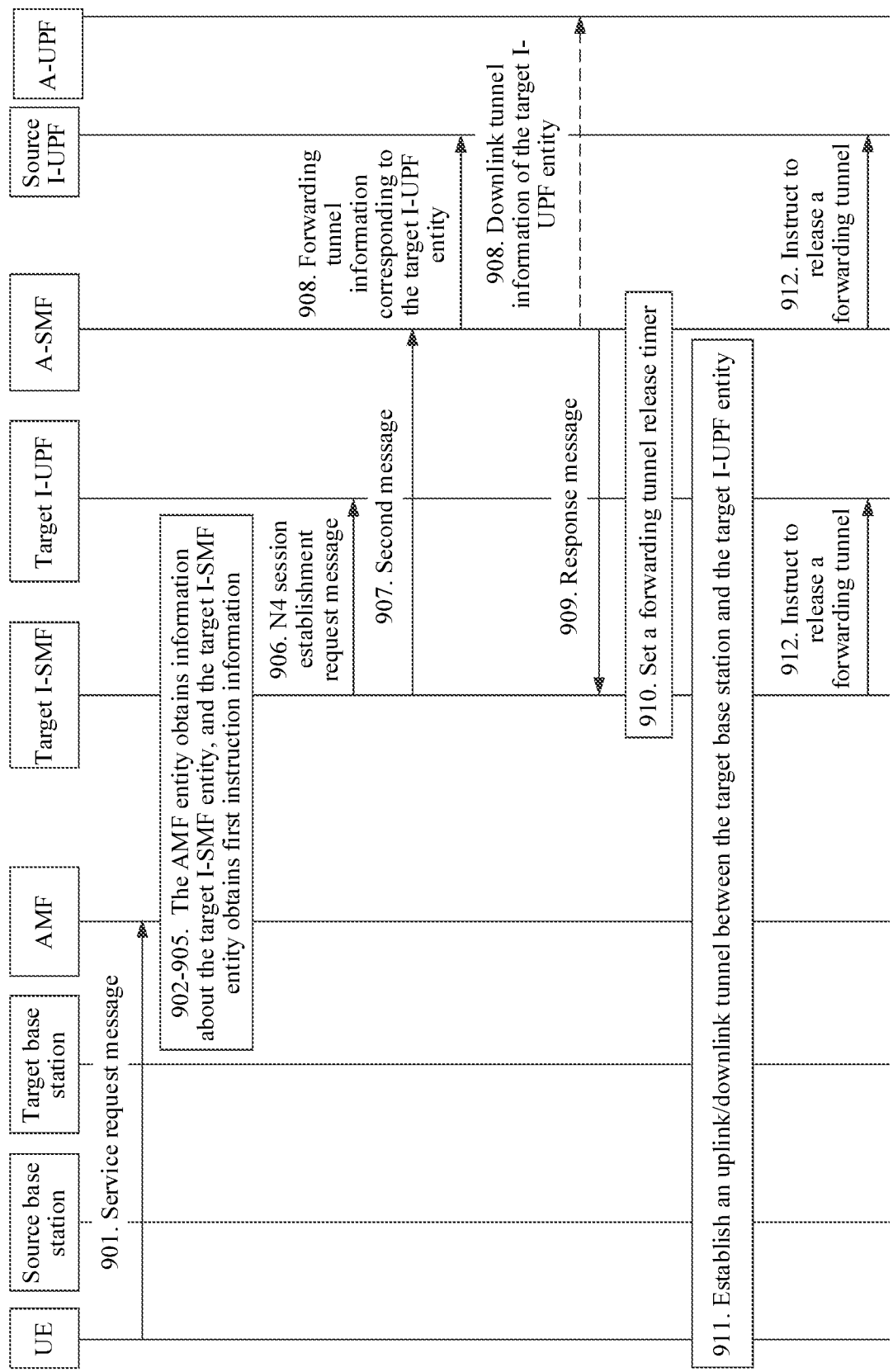
FIG. 9 is a flowchart of a communications method according to this application.

As shown in FIG. 9, an embodiment of this application provides a communications method. A procedure of the method includes the following steps.

S901: The UE sends a service request message to an AMF entity. The message includes a session identifier of a to-be-activated session and location information of the UE. The AMF entity receives the service request message.

S902 to S905: The AMF entity obtains information about the target I-SMF entity and sends a session establishment request to the target I-SMF entity. The target I-SMF entity obtains information about the A-SMF entity and first indication information.

Optionally, the target I-SMF entity may further obtain session information from the A-SMF entity in S902 to S905. Methods in which the AMF entity obtains the information about the target I-SMF entity, the target I-SMF entity obtains the information about the A-SMF entity, and the target I-SMF entity obtains the session information are the similar to those in Embodiment 1 and Embodiment 2. Details are not described again. It should be noted that the A-SMF entity is corresponding to the source SMF entity in Embodiment 1 and Embodiment 2. Therefore, a method for obtaining the information about the A-SMF entity is similar to the methods for obtaining information about the source SMF entity in Embodiment 1 and Embodiment 2.

Optionally, in S902 to S905, the target I-SMF entity further obtains the first indication information. The A-SMF entity is corresponding to the source SMF entity in Embodiment 3, and a method for obtaining the first indication information is similar to that in Embodiment 3.

S906: The target I-SMF entity selects a target I-UPF entity based on the location information of the UE. After receiving the first indication information, the target I-SMF entity adds the first indication information or second indication information to an N4 session establishment request message to be sent to the target I-UPF entity, to indicate the target I-UPF entity to establish a forwarding tunnel. The target I-UPF entity receives the N4 session establishment request message and obtains the first indication information or the second indication information.

In S906, the target I-SMF entity obtains forwarding tunnel information corresponding to the target I-UPF entity, and adds the forwarding tunnel information corresponding to the target I-UPF entity to a second message.

For a manner of obtaining the forwarding tunnel information corresponding to the target I-UPF entity by the target I-SMF entity, refer to the manner of obtaining the forwarding tunnel information corresponding to the target I-UPF entity by the target I-SMF entity in Embodiment 2. Details are not described herein again.

If the target I-SMF entity obtains the session information in the S902 to the S905, the target I-SMF entity sends uplink tunnel information of an A-UPF entity to the target I-UPF entity, and establishes a tunnel between the target I-UPF entity and the A-UPF entity in S906.

S907: The target I-SMF entity sends the second message to the A-SMF entity, and the A-SMF receives the first message.

Optionally, the target I-SMF entity adds, to the second message, forwarding tunnel establishment indication information used to indicate to establish a forwarding tunnel from a source I-UPF entity to the target I-UPF entity.

Optionally, the second message further includes downlink tunnel information of the target I-UPF entity, where the downlink tunnel information of the target I-UPF entity is used to establish a tunnel between the target I-UPF and the A-UPF.

S908: If the forwarding tunnel needs to be established, the A-SMF entity sends the forwarding tunnel information corresponding to the target I-UPF entity in the second message to the source I-UPF entity, and sends indication information to the source I-UPF entity to indicate the source I-UPF entity to establish the forwarding tunnel. The source I-UPF entity receives the forwarding tunnel information corresponding to the target I-UPF entity and the indication information, and establishes the forwarding tunnel.

Optionally, the A-SMF entity sends the downlink tunnel information of the target I-UPF entity to the A-UPF entity, and establishes the tunnel between the target I-UPF entity and the A-UPF entity.

S909: After the A-SMF entity determines that the forwarding tunnel is established, the A-SMF entity sends a response message to the target I-SMF entity, to notify the target I-SMF entity that the forwarding tunnel is established. The target I-SMF entity receives the response message, and determines that the A-SMF has established the forwarding tunnel.

S910: The A-SMF entity and the target I-SMF entity each set a forwarding tunnel release timer.

S911: The target I-SMF entity interacts with a target base station using the AMF entity, and establishes an uplink/downlink tunnel between the target base station and the target I-UPF entity. For an implementation, refer to descriptions of an existing protocol. Details are not described in this embodiment of this application.

S912: When the forwarding tunnel release timers expire, the A-SMF entity indicates the source UPF entity to release the forwarding tunnel, and the target I-SMF entity indicates the target I-UPF entity to release the forwarding tunnel.

Figure 10:
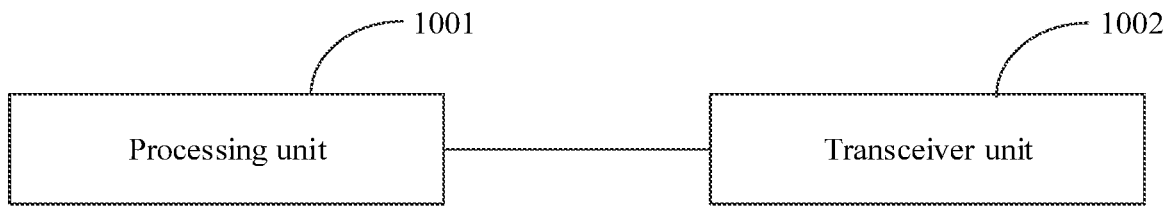
FIG. 10 is a schematic structural diagram of an apparatus according to this application.

Based on a same concept as the method embodiments, the embodiments of this application further provide an apparatus configured to perform the method performed by the target I-SMF entity in any one of the foregoing embodiments. For a related feature, refer to the foregoing method embodiments. Details are not described herein again. As shown in FIG. 10, the apparatus includes a processing unit 1001 and a transceiver unit 1002.

The processing unit 1001 is configured to obtain information about a source session management network element.

The transceiver unit 1002 is configured to send a first message to the source session management network element based on the information about the source session management network element.

The source session management network element is a session management network element that controls a user plane network element communicatively connected with a source base station. The first message is used to establish a forwarding tunnel from a source intermediate user plane network element to a target intermediate user plane network element. The source intermediate user plane network element is a user plane network element that is controlled by the source session management network element and that is communicatively connected with the source base station. Additionally, the target intermediate user plane network element is a user plane network element that is controlled by the target intermediate session management network element and that is communicatively connected with a target base station.

Before sending the first message to the source session management network element based on the information about the source session management network element, the transceiver unit 1002 may further obtain first indication information. The first indication information indicates the target intermediate session management network element to establish the forwarding tunnel.

The transceiver unit 1002 may obtain the first indication information in the following two manners.

Manner 1: The transceiver unit 1002 obtains the first indication information from the source session management network element.

Manner 2: The transceiver unit 1002 obtains the first indication information from a mobility management network element.

After obtaining the first indication information, the processing unit 1001 indicates, according to the first indication information, the target intermediate user plane network element to establish the forwarding tunnel.

Optionally, the first message includes forwarding tunnel information corresponding to the target intermediate user plane network element.

The processing unit 1001 may obtain the information about the source session management network element from the mobility management network element.

In a possible implementation, the processing unit 1001 may further set a forwarding tunnel release timer, and indicate, when the forwarding tunnel release timer expires, the intermediate user plane network element to release the forwarding tunnel.

In a possible implementation, the apparatus may further establish a tunnel between the target intermediate user plane network element and an anchor user plane network element.

For example, the transceiver unit 1002 obtains session information from the source session management network element based on the information about the source session management network element, or receives the session information from the mobility management network element.

The processing unit 1001 establishes the tunnel between the target intermediate user plane network element and the anchor user plane network element based on the session information.

The session information includes at least one of the following: uplink tunnel information of the anchor user plane network element or information about an anchor session management network element. The anchor session management network element is a session management network element that controls the anchor user plane network element.

Figure 11:
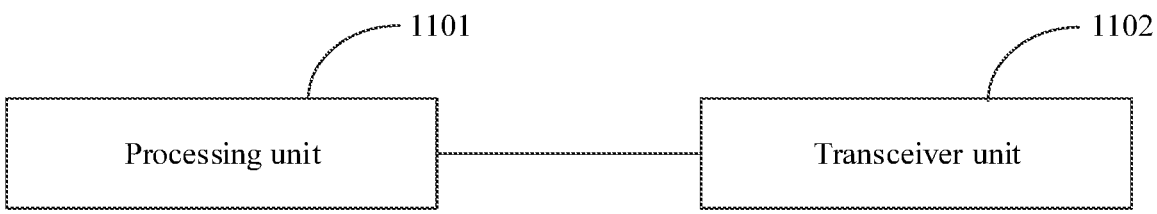
FIG. 11 is a schematic structural diagram of an apparatus according to this application.

Based on a same concept as the method embodiments, the embodiments of this application further provide an apparatus configured to perform the method performed by the source SMF entity in any one of the foregoing embodiments. For a related feature, refer to the foregoing method embodiments. Details are not described herein again. As shown in FIG. 11, the apparatus includes a processing unit 1101 and a transceiver unit 1102.

For example, the transceiver unit 1102 receives a first message from a target intermediate session management network element, and the processing unit 1101 indicates, based on the first message, a source intermediate user plane network element to establish the forwarding tunnel.

The first message is used to establish a forwarding tunnel from the source intermediate user plane network element to a target intermediate user plane network element. The source intermediate user plane network element is a user plane network element that is controlled by a source session management network element and that is communicatively connected with a source base station. The target intermediate session management network element is a session management network element that controls the target intermediate user plane network element communicatively connected with a target base station.

The apparatus may be further configured to send a first indication message.

For example, the processing unit 1101 first determines that the forwarding tunnel needs to be established, and then the transceiver unit 1102 sends the first indication information to the target intermediate session management network element or a mobility management network element. The first indication information indicates the target intermediate session management network element to establish the forwarding tunnel.

In a possible implementation, when the source session management network element or the source intermediate user plane network element has downlink data to be sent to a terminal device, the processing unit 1101 determines that the forwarding tunnel needs to be established.

Optionally, the first message includes forwarding tunnel information corresponding to the target intermediate user plane network element.

The processing unit 1101 may set a forwarding tunnel release timer, and indicate, when the forwarding tunnel release timer expires, the source intermediate user plane network element to release the forwarding tunnel.

In a possible implementation, the apparatus may further establish a tunnel between the target intermediate user plane network element and an anchor user plane network element.

For example, the transceiver unit 1102 sends session information to the target intermediate session management network element, such that the target intermediate session management network element establishes the tunnel between the target intermediate user plane network element and the anchor user plane network element. Alternatively, the transceiver unit 1102 sends session information to the mobility management network element, such that the mobility management network element sends the session information to the target intermediate session management network element.

The session information includes at least one of the following: uplink tunnel information of the anchor user plane network element or information about an anchor session management network element. The anchor session management network element is a session management network element that controls the anchor user plane network element.

Figure 12:
FIG. 12 is a schematic structural diagram of an apparatus according to this application.

Based on a same concept as the method embodiments, the embodiments of this application further provide an apparatus configured to perform the method performed by the AMF entity in any one of the foregoing embodiments. For a related feature, refer to the foregoing method embodiments. Details are not described herein again. As shown in FIG. 12, the apparatus includes a processing unit 1201 and a transceiver unit 1202.

The processing unit 1201 is configured to obtain information about a target intermediate session management network element.

The transceiver unit 1202 is configured to send information about a source session management network element to the target intermediate session management network element based on the information about the target intermediate session management network element, where the source session management network element is a session management network element that controls a user plane network element communicatively connected with a source base station. The target intermediate session management network element is a session management network element that controls a target intermediate user plane network element communicatively connected with a target base station.

The transceiver unit 1202 may further send first indication information to the target intermediate session management network element, where the first indication information indicates the target intermediate session management network element to establish a forwarding tunnel from a source intermediate user plane network element to the target intermediate user plane network element. The source intermediate user plane network element is a user plane network element that is controlled by the source session management network element and that is communicatively connected with the source base station.

In a possible implementation, before the transceiver unit 1202 sends the first indication information to the target intermediate session management network element, the processing unit 1201 determines that the forwarding tunnel needs to be established.

In a possible implementation, before the transceiver unit 1202 sends the first indication information to the target intermediate session management network element, the transceiver unit 1202 obtains the first indication information from the source session management network element.

For example, if the processing unit 1201 receives, from the source session management network element, a message used to trigger a service request procedure, the processing unit 1201 determines that the forwarding tunnel needs to be established.

The processing unit 1201 may obtain the information about the target intermediate session management network element in the following two manners.

Manner 1: The processing unit 1201 obtains location information of a terminal device, and selects the information about the target intermediate session management network element based on the location information of the terminal device.

Manner 2: The processing unit 1201 receives the information about the target intermediate session management network element from the source session management network element.

In a possible implementation, the apparatus 1200 may send session information when establishing the tunnel between the target intermediate user plane network element and an anchor user plane network element.

For example, the transceiver unit 1202 receives the session information from the source session management network element, and then sends the session information to the target intermediate session management network element. As such, the target intermediate session management network element establishes the tunnel between the target intermediate user plane network element and the anchor user plane network element.

The session information includes at least one of the following: uplink tunnel information of the anchor user plane network element or information about an anchor session management network element. The anchor session management network element is a session management network element that controls the anchor user plane network element.

Division into units in the embodiments of this application is an example, is merely logical function division and may be other division in an actual implementation. In addition, functional units in the embodiments of this application may be integrated in one processor, or may exist alone physically, or two or more units are integrated into one module. The foregoing integrated unit may be implemented in a form of hardware, or may be implemented in a form of a software functional module.

If the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several indications for indicating a terminal device (which may be a personal computer, a mobile phone, a network device, or the like) or a processor to perform all or some of the steps of the methods in the embodiments of this application. The storage medium includes various media that can store program code, such as a universal serial bus (USB) flash drive, a removable hard disk, a read-only memory (ROM), a random access memory (RAM), a magnetic disk, or an optical disc.

In the embodiments of this application, the target intermediate session management network element (e.g., target I-SMF), the source session management network element (e.g., source SMF), and the mobility management network element (e.g., AMF) may all be presented in a form of functional modules obtained through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the target intermediate session management network element, the source session management network element, and the mobility management network element may be in a form shown in FIG. 13.

Figure 13:
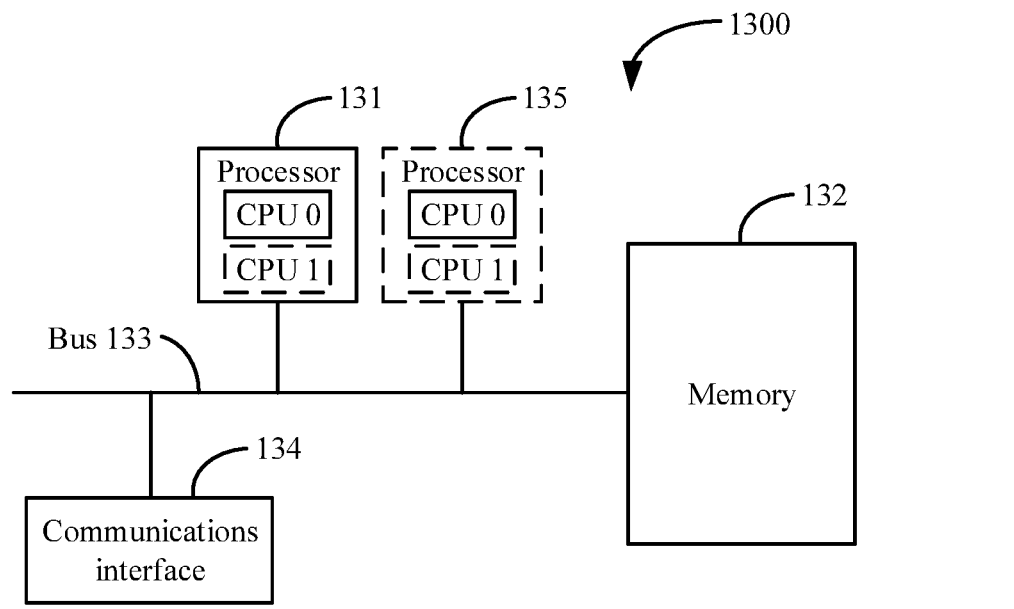
FIG. 13 is a schematic structural diagram of an apparatus according to this application.

An apparatus 1300 shown in FIG. 13 includes at least a processor 131 and a memory 132, and optionally, may further include a communications interface 134.

The memory 132 may be a volatile memory such as a random access memory.

Alternatively, the memory 132 may be a non-volatile memory such as a read-only memory, a flash memory, a hard disk drive (HDD), or a solid-state drive (SSD). Alternatively, the memory 132 is any other medium that can be used to carry or store expected program code in a command or data structure form and that can be accessed by a computer. However, this is not limited. The memory 132 may be a combination of the foregoing memories.

In this embodiment of this application, a connection medium between the processor 131 and the memory 132 is not limited. In this embodiment of this application, the memory 132 and the processor 131 are connected using a bus 133 in the figure. The bus 133 is indicated using a bold line in the figure. A manner of connection between other components is merely an example for description, and imposes no limitation. The bus 133 may be classified into an address bus, a data bus, a control bus, or the like. For ease of representation, only one thick line is used to represent the bus in FIG. 13, but this does not mean that there is only one bus or only one type of bus.

The processor 131 may have data receiving and sending functions, and can communicate with another device. In the apparatus shown in FIG. 13, an independent data transceiver module may alternatively be set. For example, the communications interface 134 is configured to receive and send data. When the processor 131 communicates with another device, data may be transmitted through the communications interface 134.

When the target intermediate session management network element is in a form shown in FIG. 13, the processor 131 in FIG. 13 may invoke a computer-executable instruction stored in the memory 132, such that the target intermediate session management network element can perform the method performed by the target I-SMF in any one of the foregoing method embodiments.

When the source session management network element is in a form shown in FIG. 13, the processor 131 in FIG. 13 may invoke a computer-executable instruction stored in the memory 132, such that the source session management network element can perform the method performed by the source SMF in any one of the foregoing method embodiments.

When the mobility management network element is in a form shown in FIG. 13, the processor 131 in FIG. 13 may invoke a computer-executable instruction stored in the memory 132, such that the mobility management network element can perform the method performed by the AMF in any one of the foregoing method embodiments.

For example, functions/implementation processes of the transceiver unit and the processing unit in FIG. 10 to FIG. 12 may be implemented by the processor 131 in FIG. 13 by invoking the computer-executable instruction stored in the memory 132. Alternatively, function/implementation process of the processing unit in FIG. 10 to FIG. 12 may be implemented by the processor 131 in FIG. 13 by invoking the computer-executable instruction stored in the memory 132, and function/implementation process of the transceiver unit in FIG. 10 to FIG. 12 may be implemented by the communications interface 134 in FIG. 13.

The processor 131 may include one or more CPUs, for example, a CPU 0 and a CPU 1 in FIG. 13.

The apparatus 1300 may include a plurality of processors, for example, the processor 131 and a processor 135 in FIG. 13.

The apparatus provided in this embodiment of this application may perform the foregoing communications method. Therefore, for technical effects that can be obtained by the apparatus, refer to the foregoing method embodiments. Details are not described herein again.

In this application, after obtaining the information about the target intermediate session management network element, the mobility management network element sends the information about the source session management network element to the target session management network element. After obtaining the information about the source session management network element, the target session management network element sends the first message to the source session management network element based on the information about the source session management network element. The first message is used to establish the forwarding tunnel from the source intermediate user plane network element to the target intermediate user plane network element. After receiving the first message from the target intermediate session management network element, the source session management network element indicates, based on the first message, the source intermediate user plane network element to establish the forwarding tunnel. According to the manner in the embodiments of this application, the forwarding tunnel from the source intermediate user plane network element to the target intermediate user plane network element is established. As such, the source intermediate user plane network element can forward data to the target intermediate user plane network element through the forwarding tunnel, to implement handover from the target intermediate session management network element to the source session management network element, maintain a session, and ensure service continuity of the terminal device.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by the computer or the processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or any other programmable data processing device, such that a series of operations and steps are performed on the computer or any other programmable device, thereby generating computer-implemented processing. Therefore, the instructions executed on the computer or any other programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A communications method, comprising:
    obtaining, by a target intermediate session management device, information about a source intermediate session management device;
    sending, by the target intermediate session management device, a first message to the source intermediate session management device based on the information, wherein the first message is for establishing a forwarding tunnel between a source intermediate user plane device and a target intermediate user plane device, wherein the source intermediate user plane device is controlled by the source intermediate session management device and is communicatively connected to a source base station, and wherein the target intermediate user plane device is controlled by the target intermediate session management device and is communicatively connected to a target base station;

receiving, by the source intermediate session management device, the first message from the target intermediate session management device;

instructing, by the source intermediate session management device based on the first message, the source intermediate user plane device to establish the forwarding tunnel;

obtaining, by the target intermediate session management device, information about an anchor session management device;

sending, by the target intermediate session management device, downlink tunnel information of the target intermediate user plane device to the anchor session management device based on the information about the anchor session management device;

receiving, by the anchor session management device, the downlink tunnel information of the target intermediate user plane device; and instructing, by the anchor session management device, an anchor user plane device to establish a downlink tunnel between the anchor user plane device and the target intermediate user plane device.

2. The communications method according to claim 1, further comprising:

sending, by the source intermediate session management device, first indication information to the target intermediate session management device, wherein the first indication information indicates that the forwarding tunnel needs to be established; and obtaining, by the target intermediate session management device, the first indication information.

3. The communications method according to claim 2, further comprising determining, by the source intermediate session management device, that the forwarding tunnel needs to be established when the source intermediate session management device or the source intermediate user plane device has incoming downlink data to be sent to a terminal device.

4. The communications method according to claim 2, further comprising instructing, by the target intermediate session management device according to the first indication information, the target intermediate user plane device to establish the forwarding tunnel.

5. The communications method according to claim 1, wherein the first message comprises forwarding tunnel information corresponding to the target intermediate user plane device.

6. The communications method according to claim 1, wherein obtaining the information about the source intermediate session management device comprises obtaining, by the target intermediate session management device, the information from a mobility management device.

7. The communications method according to claim 1, further comprising:

setting, by the target intermediate session management device, a forwarding tunnel release timer; and instructing, by the target intermediate session management device when the forwarding tunnel release timer expires, the target intermediate user plane device to release the forwarding tunnel.

8. The communications method according to claim 1, further comprising:

sending, by the source intermediate session management device, uplink tunnel information of the anchor user plane device to the target intermediate session management device; and obtaining, by the target intermediate session management device, the uplink tunnel information of the anchor user plane device from the source intermediate session management device based on the information about the source intermediate session management device.

9. The communications method according to claim 8, further comprising instructing, by the target intermediate session management device, the target intermediate user plane device to establish an uplink tunnel between the target intermediate user plane device and the anchor user plane device based on the uplink tunnel information of the anchor user plane device.

10. The communications method according to claim 1, wherein the source intermediate session management device is configured to control a user plane device communicatively connected to the source base station.

11. A communications system, comprising:

a source intermediate session management device;

an anchor session management device; and a target intermediate session management device configured to:

obtain information about the source intermediate session management device;

send a first message to the source intermediate session management device based on the information:

obtain information about the anchor session management device; and send downlink tunnel informaton of the target intermediate user plane device to the anchor session management device based on the information about the anchor session management device, wherein the source intermediate session management device is configured to:

receive the first message from the target intermediate session management device; and instruct, based on the first message, a source intermediate user plane device to establish a forwarding tunnel between the source intermediate user plane device and a target intermediate user plane device, wherein the source intermediate user plane device is controlled by the source intermediate session management device and is communicatively connected to a source base station, and wherein the target intermediate user plane device is controlled by the target intermediate session management device and is communicatively connected to a target base station, wherein the anchor session management device is configured to:

receive the downlink tunnel information of the target intermediate user plane device; and instruct an anchor user plane device to establish a downlink tunnel between the anchor user plane device and the target intermediate user plane device.

12. The communications system according to claim 11, wherein the source intermediate session management device is further configured to send first indication information to the target intermediate session management device, wherein the first indication information indicates that the forwarding tunnel needs to be established, and wherein the source intermediate session management device is configured to obtain the first indication information.

13. The communications system according to claim 12, wherein the source intermediate session management device is further configured to determine that the forwarding tunnel needs to be established when the source intermediate session management device or the source intermediate user plane device has incoming downlink data to be sent to a terminal device.

14. The communications system according to claim 12, wherein the target intermediate session management device is further configured to instruct the target intermediate user plane device to establish the forwarding tunnel according to the first indication information.

15. The communications system according to claim 11, wherein the first message comprises forwarding tunnel information corresponding to the target intermediate user plane device.

16. The communications system according to claim 11, wherein the target intermediate session management device is further configured to obtain the information from a mobility management device.

17. The communications system according to claim 11, wherein the target intermediate session management device is further configured to:

set a forwarding tunnel release timer; and
instruct the target intermediate user plane device to release the forwarding tunnel when the forwarding tunnel release timer expires.

18. The communications system according to claim 11, wherein the source intermediate session management device is further configured to send uplink tunnel information of the anchor user plane device to the target intermediate session management device, and wherein the target intermediate session management device is further configured to obtain the uplink tunnel information of the anchor user plane device from the source intermediate session management device based on the information about the source intermediate session management device.

19. The communications system according to claim 18, wherein the target intermediate session management device is further configured to instruct the target intermediate user plane device to establish an uplink tunnel between the target intermediate user plane device and the anchor user plane device based on the uplink tunnel information of the anchor user plane device.

20. The communications system according to claim 11, wherein the source intermediate session management device is to control a user plane device communicatively connected to the source base station.

\* \* \* \* \*

UNITED STATES PATENT AND TRADEMARK OFFICE
CERTIFICATE OF CORRECTION

PATENT NO. : 11,463,920 B2
APPLICATION NO. : 17/037172
DATED : October 4, 2022
INVENTOR(S) : Zaifeng Zong and Fenqin Zhu It is certified that error appears in the above-identified patent and that said Letters Patent is hereby corrected as shown below:

In the Claims

Claim 20, Column 44, Line 23: "is to control" should read "is further configured to control"

Signed and Sealed this
Sixth Day of December, 2022

Katherine Kelly Vidal
*Director of the United States Patent and Trademark Office*